(12) United States Patent
Kim et al.

(10) Patent No.: US 10,083,047 B2
(45) Date of Patent: Sep. 25, 2018

(54) SYSTEM AND METHOD FOR EXECUTING MULTIPLE TASKS IN A MOBILE DEVICE

(75) Inventors: Yung Kwan Kim, Seongnam-si (KR); Yong Jin Kwon, Suwon-si (KR); Jae Sook Joo, Seongnam-si (KR); Tai Soo Park, Anyang-si (KR); Hyeon Ji, Suwon-si (KR); Jeong Ah Park, Seoul (KR); Jung Sik Sung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 908 days.

(21) Appl. No.: 13/493,194

(22) Filed: Jun. 11, 2012

(65) Prior Publication Data

US 2012/0320081 A1    Dec. 20, 2012

(30) Foreign Application Priority Data

Jun. 14, 2011   (KR) .................. 10-2011-0057413
Jan. 12, 2012   (KR) .................. 10-2012-0003872

(51) Int. Cl.
*G09G 5/00*     (2006.01)
*G06F 9/445*    (2018.01)

(52) U.S. Cl.
CPC .............................. *G06F 9/44505* (2013.01)

(58) Field of Classification Search
None
See application file for complete search history.

(56) References Cited

U.S. PATENT DOCUMENTS

| 7,779,213 B2 | 8/2010 | Ferren et al. |
|---|---|---|
| 2006/0099938 A1 | 5/2006 | Lee |
| 2010/0066698 A1* | 3/2010 | Seo ............................... 345/173 |
| 2010/0088635 A1* | 4/2010 | Louch ........................... 715/802 |
| 2010/0313165 A1* | 12/2010 | Louch et al. ................. 715/792 |
| 2011/0061056 A1 | 3/2011 | Shu |
| 2011/0124376 A1* | 5/2011 | Kim et al. .................... 455/566 |
| 2011/0244924 A1* | 10/2011 | Jung et al. .................... 455/566 |
| 2012/0185796 A1* | 7/2012 | Tanaka .......................... 715/781 |

(Continued)

FOREIGN PATENT DOCUMENTS

| CN | 1774006 A | 5/2006 |
|---|---|---|
| CN | 101676853 A | 3/2010 |

(Continued)

OTHER PUBLICATIONS

Mr. Byte, "How to Minimize and Maximize Windows Using Keyboard Shortcuts in XP and Vista?", Jan. 31, 2008, XP-002684245.

(Continued)

*Primary Examiner* — Xiao Wu
*Assistant Examiner* — Mohammad H Akhavannik
(74) *Attorney, Agent, or Firm* — Jefferson IP Law, LLP

(57) ABSTRACT

A multitasking system and method are provided. The system and method allows a mobile device with a limited amount of resources to execute applications in full and mini modes, thereby using a relatively small amount of resources and efficiently using the execution screens. The method includes detecting a first event for executing a first application, identifying the type of first execution event, executing the first application in at least one of a full mode and a mini mode according to the type of first execution event, and displaying an execution screen of the first application executed in the at least one mode.

26 Claims, 20 Drawing Sheets

(56) References Cited

U.S. PATENT DOCUMENTS

2012/0272128 A1\* 10/2012 Takaku et al. ................ 715/205
2012/0290966 A1    11/2012 Chae et al.

FOREIGN PATENT DOCUMENTS

| CN | 102023795 A | 4/2011 |
|---|---|---|
| JP | 2008-117181 A | 5/2008 |
| KR | 10-2008-0039642 A | 5/2008 |
| KR | 10-2010-0070819 A | 6/2010 |
| KR | 10-2011-0063409 A | 6/2011 |
| WO | 2011/039940 A1 | 4/2011 |

OTHER PUBLICATIONS

Rossano Pablo Pinto et al., "A Component Framework for Context-Awareness", Wireless Communications and Mobile Computing Conference, Aug. 6, 2008, pp. 315-320.

\* cited by examiner

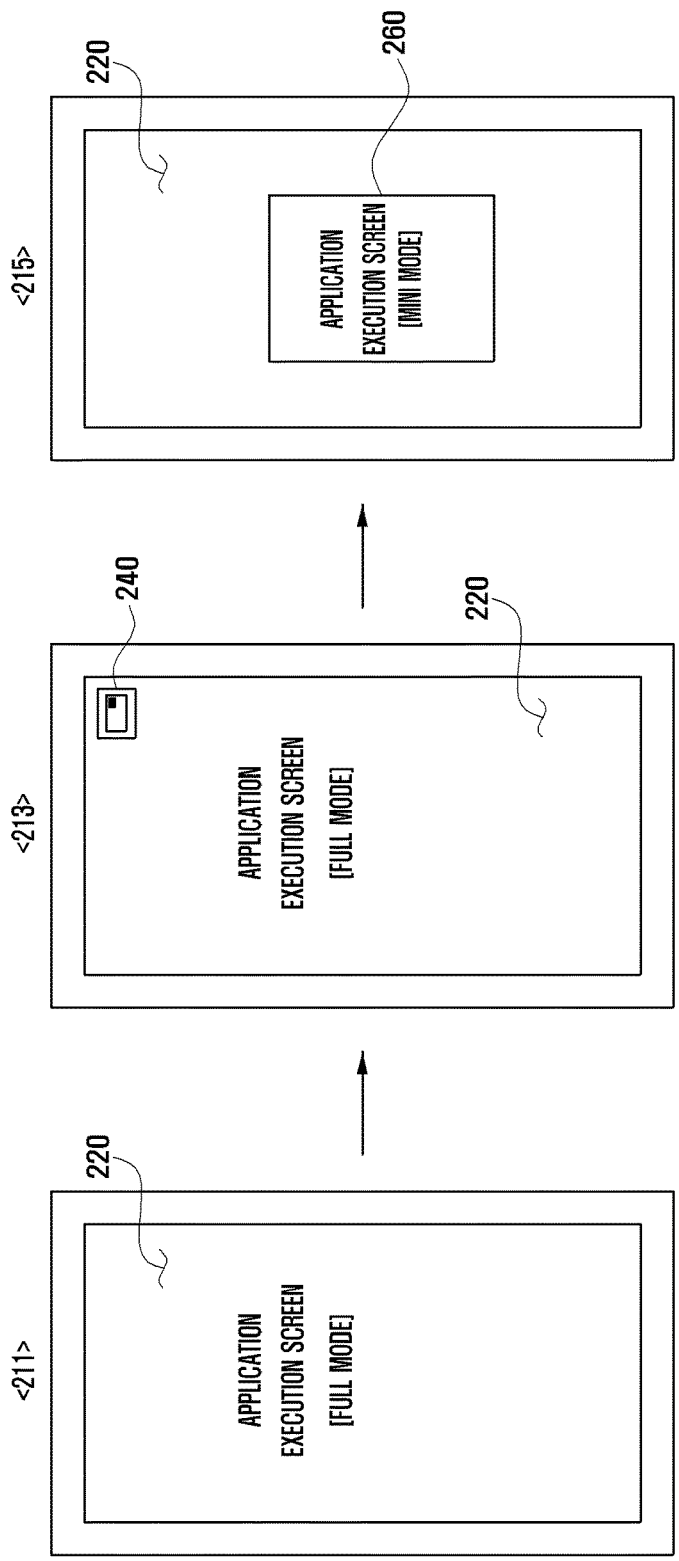

SYSTEM AND METHOD FOR EXECUTING MULTIPLE TASKS IN A MOBILE DEVICE

PRIORITY

This application claims the benefit under 35 U.S.C. § 119(a) of a Korean patent application filed on Jun. 14, 2011 in the Korean Intellectual Property Office and assigned Serial No. 10-2011-0057413, and of a Korean patent application filed on Jan. 12, 2012 in the Korean Intellectual Property Office and assigned Serial No. 10-2012-0003872, the entire disclosure of each of which is hereby incorporated by reference.

BACKGROUND OF THE INVENTION

1. Field of the Invention

The present invention relates to a system and method that allows a mobile device to execute applications. More particularly, the present invention relates to a system and method that allows a mobile device with a limited amount of resources to execute applications using a relatively small amount of resources in a light-weight mode (mini mode) and a full-function mode (full mode) during a multitasking mode, and to support an efficient use of a screen.

2. Description of the Related Art

With the rapid development of digital technology, various types of mobile devices have been developed that can execute communication and allow users to process jobs. Examples of such mobile devices are mobile communication terminals, Personal Digital Assistants (PDAs), electronic organizers, smartphones, tablet Personal Computers (tablet PCs), etc. Mobile devices provide a variety of services such as a video call, an electronic note function, a document editing function, an e-mailing function, an interne function, etc., as well as a voice call or a Short Message Service (SMS) message transmission.

In accordance with a user's requirement for various types of services, although mobile devices of the related art have a limited amount of resources, such as, processor capability, memory capacity, electric power, etc., they tend to execute a number of application programs, which is called multitasking.

However, mobile devices of the related art are designed to display only one screen for one executed application on the display unit during the multitasking process. Since mobile devices typically have one display unit, they only display a screen for the foreground application but not a background application, during the multitasking process. Therefore, the users have difficulty using the screens of the mobile devices.

When mobile devices of the related art execute a foreground application in a multitasking mode, its functions and all user interfaces are also executed as background applications. This means mobile devices of the related art with a limited amount of resources have reduced user efficiency of resources. That is, when mobile devices operate a number of applications in the background, the speed or performance is reduced. As such, when mobile devices of the related art execute a number of applications in a multitasking mode, they may compulsorily interrupt part of the applications to which resources are not allocated or an application with the highest priority of execution path, due to the lack of resources such as a processor, memory, electric power, etc., irrespective of the users' demands.

SUMMARY OF THE INVENTION

Aspects of the present invention are to address at least the above-mentioned problems and/or disadvantages and to provide at least the advantages described below. Accordingly, an aspect of the present invention is to provide a system and method that allow a mobile device with a limited amount of resources to efficiently execute multiple tasks.

Another aspect of the present invention is to provide a system and method that allow a mobile device user to execute a multitasking function in the mobile device using a relatively small amount of resources, thereby efficiently operating a number of functions.

Another aspect of the invention is to provide a system and method that allow a user to conveniently perform multiple tasks on a display unit of a mobile device with a limited amount of resources, which is limited in area.

Another aspect of the invention is to provide a system and method that can support a multitasking function in a mobile device based on a relatively small amount of resources and allow the mobile device to efficiently configure an efficient user interface and screen in the multitasking mode, so that the user can conveniently use a number of functions. The invention further provides a system and method that allow a mobile device with a limited amount of resources to execute a number of applications using a relatively small amount of resources, by separately operating in a light-weight mode (mini mode) and a full-function mode (full mode), thereby efficiently using the screens for the executed applications in the multitasking mode.

Another aspect of the present invention is to provide a system and method that can simultaneously support a full mode for a first application on one screen and a mini mode for a second application on a down-sized screen, and can execute multiple tasks based on the full and mini modes.

Another aspect of the present invention is to provide a system and method that can provide an optimal environment to a mobile device with a limited amount of resources where the user can conveniently execute multiple tasks, which enhances the usability of the mobile device.

In accordance with an aspect of the present invention, a method for executing multiple tasks in a mobile device is provided. The method includes detecting a first event for executing a first application, identifying the type of first execution event, executing the first application in at least one of a full mode and a mini mode according to the type of first execution event, and displaying an execution screen of the first application executed in the at least one mode.

In an exemplary implementation, the method may further include receiving an event for calling a tray on an execution screen of the first application in the full mode, activating the tray on the execution screen of the first application, creating the executing event on a second shortcut item in the tray, executing a second application according to the second shortcut item in a mini mode, and displaying an execution screen of the second application as a mini screen on the full mode execution screen of the first application.

In accordance with another aspect of the invention, a method for executing multiple tasks in a mobile device is provided. The method includes displaying an execution screen of an application executed in a full mode as the entire screen, inputting a first user event to a mode switching item selectively provided on the execution screen in the full mode, switching the full mode of the application to a mini mode in response to the first user input event, displaying the execution screen in the mini mode as a mini screen, inputting a second user event on the mini screen in a mini mode, switching the mini mode of the application to the full mode in response to the second user input event, and displaying the execution screen in the full mode as the entire screen.

In an exemplary implementation, the method may further include sharing, when an application that is executed in one of the mini and full modes is interrupted, data created when the application is executed in the mini and full modes with the other mode, and updating the execution screen.

In an exemplary implementation, the method may be implemented with programs that can be executed by a processor, which are stored in a computer-readable recording media.

In accordance with another aspect of the invention, a mobile device is provided. The mobile device includes a display unit for displaying screens of at least one application executed in a full mode or a mini mode, a storage unit for storing data created when the at least one application is executed in the full mode or the mini mode, and a controller. The controller identifies types of execution events of the at least one application. Also, the controller executes a corresponding one of the at least one application in at least one of the full mode and the mini mode and displays an execution screen of the corresponding application in at least one mode.

In accordance with another aspect of the invention, a computer readable medium containing program instructions executable by a processor of a mobile device is provided. The computer readable medium includes displaying an execution screen of an application executed in a full mode as the entire screen, inputting a first user event to a mode switching item selectively provided on the execution screen in the full mode, switching the full mode of the application to a mini mode in response to the first user input event, displaying the execution screen in the mini mode as a mini screen, inputting a second user event on the mini screen in the mini mode, switching the mini mode of the application to the full mode in response to the second user input event; and displaying the execution screen in the full mode as the entire screen.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the invention will become more apparent from the following description taken in conjunction with the accompanying drawings, in which:

FIGS. 2A and 2B illustrate screens when a mobile device executes an application in modes according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figure 1:
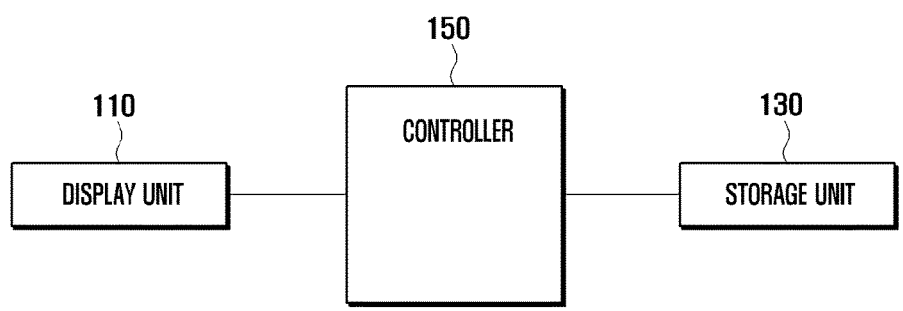
FIG. 1 illustrates a schematic block diagram of a mobile device according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the invention relate to a multitasking system and method that can allow a mobile device with a limited amount of resources, e.g., memory, processor, electric power, etc., to efficiently execute multitasking and to efficiently use the screen of the limited display unit. The mobile device executes the applications in a full-function mode and a light-weight mode.

The full-function mode refers to a mode where the mobile device can execute the entire function of each application and display the executed function on the entire screen. That is, the full-function mode refers to an operation mode in which applications of a mobile device can be executed, the executed application can be displayed on the entire screen, and the entire function of a corresponding application can be executed. In the following description, the term 'full-function mode' may be called 'full mode' for convenience.

The light-weight mode refers to a mode in which the mobile device can execute only the primary functions of each application, using a minimum amount of resources, via a least amount of user interfaces and effects, and the executed application can be displayed only on a part of the entire screen. That is, in a light-weight mode, the mobile device executes primary user interfaces and functions of an application, using the least amount of resources. The light-weight mode refers to a mode where a downsized application is executed with a relatively small amount of resources, compared to a mode where the application before being downsized needs the amount of resources for the execution. The light-weight mode may be executed individually or together with the full mode. For example, while an application is operated in a full mode, the application and/or another application are also operated in a light-weight mode or only in light-weight modes. The execution screen of an application in a light-weight mode is displayed on part of the entire screen. The application execution screen in a light-weight mode moves in the area of the entire screen and also varies in size. In the following description, the term 'light-weight mode' may be called 'mini mode' for convenience.

The mobile device can execute an application in a mini mode using a smaller amount of resources (e.g., processor, memory, electric power, etc.) than in a full mode, and can also efficiently display screens of the application on the limited display unit. Executing an application in a mini mode can be achieved by any type of created events for executing a full mode (e.g., gesture, launcher, tray, motion, etc.).

When the mobile device detects a lack of resources while a plurality of applications operate in a full mode and a mini mode, it can interrupt the applications according to a user's settings. For example, when applications are operated in mini and full modes, the mobile device can interrupt either one of the modes. Alternatively, while the mobile device continues the executing of the applications in a mini mode, it interrupts the other applications operating in a full mode from the lowest priority in order.

The mobile device can execute applications in a mini mode and/or a full mode. That is, the mobile device can support a multitasking function in a full mode where all functions of each application can be executed and in a mini mode where primary functions of each application, such as user interfaces and effects, can be executed. The two modes share the data storage area of the storage unit and the primary module (e.g., processor) when applications are executed for the same function. When the mobile device operates in a single tasking mode in which it executes only one application, it can execute the application in a mini mode or a full mode. On the contrary, when the mobile device operates in a multitasking mode where it simultaneously executes a number of applications, it can execute each of them in at least one of the mini mode and the full mode. When the mobile device executes the plurality of applications in a multitasking mode, each application can be switched between the mini and full modes according to a user's input events.

The mobile device allows the user to execute one or more applications in a mini mode to enjoy the advantages of multitasking jobs. When the mobile device operates in a single tasking or multiple tasking mode, the user can selectively execute an application in a mini or full mode, thereby more efficiently using resources of the mobile device.

In the following description, an exemplary configuration of a mobile device and an exemplary method for controlling a mobile device are explained in more detail by referring to the accompanying drawings. It should be understood that the invention is not limited to the following exemplary embodiments and that there may be many modifications from the exemplary embodiments that are provided.

FIG. 1 illustrates a schematic block diagram of a mobile device according to an exemplary embodiment of the present invention.

Referring to FIG. 1, the mobile device includes a display unit 110, a storage unit 130, and a controller 150. It should be understood that the mobile device may further include an audio processing unit with a microphone and a speaker, a digital broadcasting module for receiving broadcasts for Digital Multimedia Broadcasting (DMB), Digital Video Broadcasting (DVB), etc., a camera module for acquiring still images or videos, a short-range communication module for executing a communication mode, e.g., Bluetooth communication, Infrared Data Association (IrDA), Radio Frequency Identification (RFID) communication, Near Field Communication (NFC), etc., an RF module for supporting a voice call, a video call, data communication, etc., an Internet module for supporting Internet Protocol (IP) based Internet communication, a touchpad, a touch screen, a battery, etc.

The display unit 110 displays the states and operations of the mobile device. For example, the display unit 110 displays a home screen or screens according to the execution of applications. The display unit 110 may be implemented with a Liquid Crystal Display (LCD), an Organic Light Emitting Diode (OLED), an Active Matrix Organic Light Emitting Diodes (AMOLED), or the like. The display unit 110 may include a touch-based interface. For example, when the display unit 110 is implemented with a touch screen, it senses an event created via a user's touch, creates a signal according to the event, and transfers it to the controller 150.

The display unit 110 displays an execution screen of an application in a mini mode and/or a full mode. In addition, during the display, the display unit 110 may display the screen in a landscape or portrait mode according to the rotation or tilt of the mobile device or the screen switched according to the alteration between the landscape mode and the portrait mode.

The storage unit 130 stores applications and data created when the applications are executed. The storage unit 130 may be implemented with at least one or more volatile memory devices and non-volatile memory devices. Examples of the non-volatile memory devices are Read Only Memory (ROM), flash memory, etc. An example of the volatile memory device is Random Access Memory (RAM), etc. The storage unit 130 stores an Operating System (OS) of the mobile device, data and programs that are related to the input operations and display operations of the display unit 110. The storage unit 130 also stores data and programs that are related to a multitasking or single tasking operation in a mini mode and a full mode. The storage unit 130 also stores data and programs that are related to the screen operations according to the execution of an application in a mini mode and/or a full mode.

The storage unit 130 stores setting information related to the execution of applications in order to efficiently use resources of the mobile device. Examples of the setting information may be user event information related to the execution of an application in mini and full modes, mode information that will be executed according to the user's events, information regarding an attempt to execute applications in a mini mode, information regarding at least one item registered in a tray, meta information representing the connection between an item when an application is executed in a full mode and an item when an application is executed in a mini mode, and information as to whether a previous mode is retained when switching between the full mode and the mini mode.

The storage unit 130 stores data created via the applications in a full mode and a mini mode, where the data is shared. For example, data created when an application is executed in a full mode and in a mini mode can be stored in a storage area of in the storage unit 130, allocated to the application. After that, the stored data can be retrieved in a full mode or a mini mode. That is, although one application is executed, when switching from one mode to another, the created data is stored in the same storage area and the information regarding the switched mode is shared.

The controller 150 controls the operations related to the application execution modes to efficiently use the resources in the mobile device. For example, the controller 150 controls the execution of an application in a full or mini mode in response to an application execution event. When an application is executed in a full or mini mode, the controller 150 can execute another application in the full or mini mode, in response to another application execution event, during a multitasking mode. That is, while the controller 150 retains a mode where an application is executed, it can execute another application in a full or mini mode. When an application is executed in a full or mini mode, the controller 150 can execute the application by switching the mode to the opposite mode. That is, the controller 150 can adaptively switch from a full mode to a mini mode or vice versa, in response to a user's input event. The controller 150 can allow the storage area to be shared between data created when an application is executed in a full mode and a mini mode, and can also share data or information regarding the alteration in a full mode and a mini mode.

The controller 150 identifies an event related to the execution of the application and executes an application in a mini mode or a full mode according to the event. When an application is executed in a mode, the controller 150 can control a switching operation from one mode to another mode according to the user created event. That is, the controller 150 can execute another mode, by retaining the previous mode or after interrupting the previous mode, according to preset information. For example, when an application is executed in a full mode and a mode switching event occurs, the controller 150 can execute the application in a mini mode, by retaining it in full mode, thereby displaying both applications on the screen in full mode and mini mode. Likewise, when an application is executed in a full mode and a mode switching event occurs, the controller 150 interrupts the application executed in a full mode and instead executes it in a mini mode, thereby displaying the applications on the screen only in a mini mode.

While the controller 150 is executing an application in a mini mode and/or a full mode, it can also execute another application in a mini mode and/or a full mode according to a user's input event, during the multitasking mode. The controller 150 can also share the data, created and stored via an application, between a full mode and a mini mode.

The controller 150 will be described in more detail when the mobile device is described below. The controller 150 can also control the usual functions of the mobile device as well as the functions described above. For example, when an application is executed, the controller 150 can control the operation and the screen display. The controller 150 can also receive signals created when various types of events occur in a touch-based input interface, and control the functions corresponding thereto. The controller 150 controls the reception and transmission of data in wired/wireless communication.

The invention can be applied to any type of mobile devices, for example, a bar type, a folder type, a slide type, a swing type, a flip-flop type, etc. The mobile device according to exemplary embodiments of the invention includes all information communication devices, multimedia devices, and their applications, which are operated according to communication protocols corresponding to a variety of communication systems. For example, the mobile device can be applied to mobile communication terminals, tablet Personal Computers (PCs), smartphones, Portable Multimedia Players (PMPs), media players, mobile game players, Personal Digital Assistants (PDAs), etc.

In addition, the system and method, according to exemplary embodiments of the invention, can be adapted to PMPs, digital broadcast players, mobile game players, PDAs, mobile devices, television sets, Large Format Displays (LFDs), Digital Signages (DSs), media poles, etc.

Figure 2A:
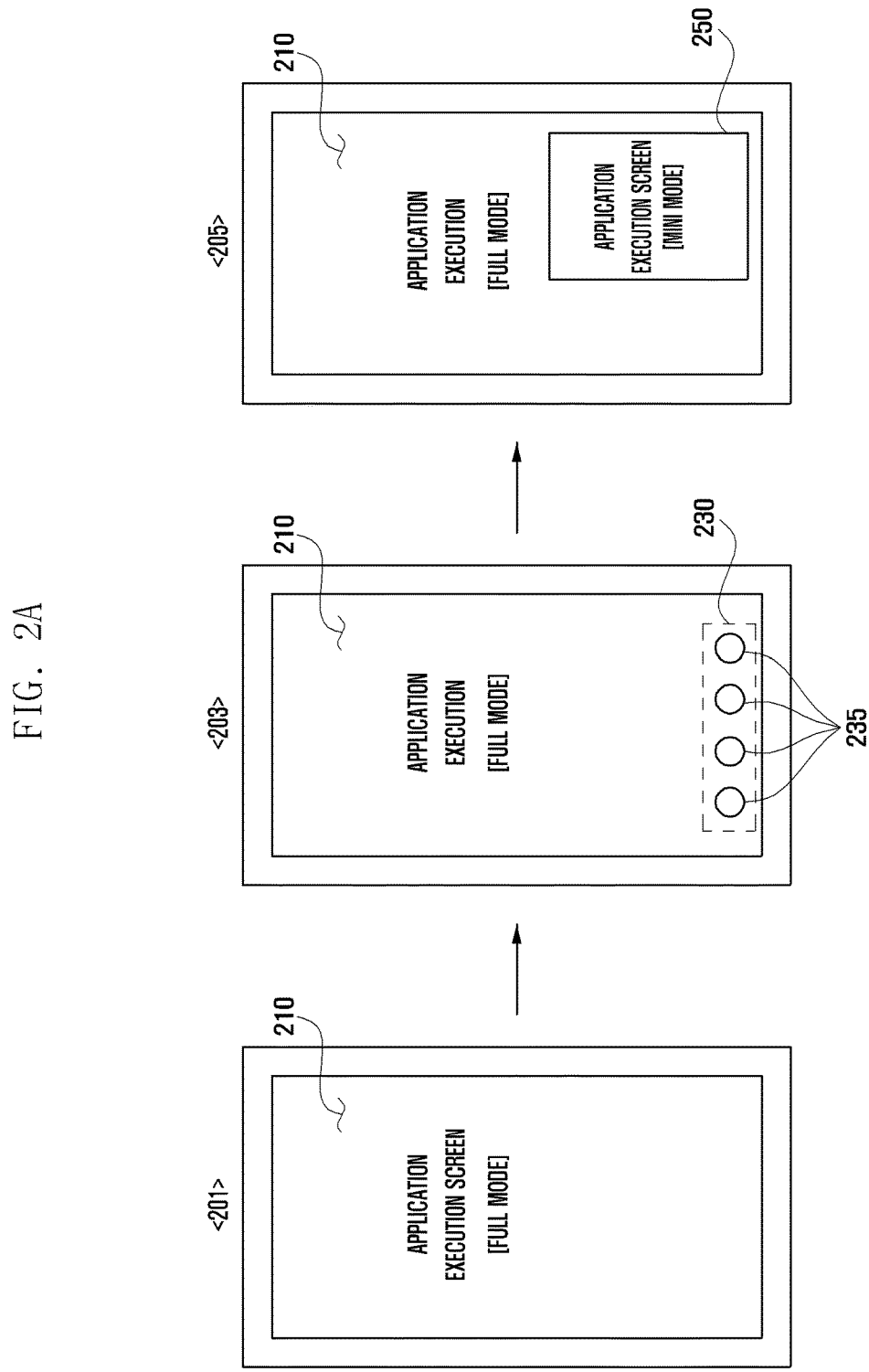

FIGS. 2A and 2B illustrate screens when a mobile device executes an application in modes according to an exemplary embodiment of the present invention.

More specifically, FIG. 2A illustrates screens showing a method for executing full and mini modes using a tray 230 and FIG. 2B illustrates screens showing a method for executing full and mini modes using a mode switching item 240.

Referring to FIG. 2A, as shown in diagram 201, it is assumed that, when the mobile device executes an application in a full mode, it displays a first execution screen 210 of the application on the entire screen. Displaying the screen as shown in diagram 201 (i.e., the first execution screen 210) is performed to execute an application in the mobile device, according to a general procedure.

During the display of the first execution screen 210 as shown in diagram 201, an event for calling a tray 230 occurs on a region on the first execution screen 210. The tray 230 refers to an area where at least one item 235 is registered to execute an application in a mini mode. The tray 230 may be toggled according to a user's input. For example, when the tray 230 is not displayed on the screen as shown in diagram 201, it can appear on the screen according to a user's input as shown in diagram 203. Likewise, when the tray is displayed on the screen as shown in diagram 203, it may disappear according to a user's input as shown in diagram 201. These operations may be displayed as fade-in and fade-out effects.

As shown in diagram 203, the tray 230 may appear on the execution screen 210 according to a tray calling event. The tray calling event refers to an event that occurs when the user touches a region where a tray 230 is allocated and hidden (e.g., at the bottom of the screen shown in diagram 203). The tray calling event may be achieved by at least one of a tap, a drag, a sweep, a flick, etc. Alternatively, the tray calling event may also be achieved when the user touches a preset hot key for activating the tray 230.

The tray 230 may be displayed in an activated/deactivated state in a preset region on the screen. For example, the tray 230 is not shown in the preset region, as shown in diagram 201, and is shown when the user creates a tray calling event, as shown in diagram 203. The region allocated for the tray 230 is provided as a horizontal bar near the bottom or top on the screen. Alternatively, the region may also be provided as a vertical bar near the right or left edge on the screen. The shape and location of the tray 230 may be set according to the user's settings. In addition, as shown in diagram 203, the tray 230 may provide items 235, used for executing mini modes, in a row. Alternatively, the tray 230 may also provide items in two or more rows according to the number of items.

During the display of the first execution screen 210 showing the tray 230 as shown in diagram 203, when a user's event for selection occurs on one of the items 235 in the tray 230, the application corresponding to the selected item is executed in a mini mode as shown in diagram 205. The application executed in a mini mode may be displayed as a second execution screen 250 on the first execution screen 210. The second execution screen 250 may be displayed on a preset region, for example, the top, bottom, right, left, top right or left, bottom right or left, middle, or the like.

In an exemplary embodiment of the invention, the first 210 and second 250 execution screens may be a screen in a full mode and a screen in a mini mode for the same application or for different applications. That is, the first 210 and second 250 execution screens may display the same application or different applications.

Referring to FIG. 2B, as shown in diagram 211, it is assumed that, when the mobile device executes an application in a full mode, it displays a first execution screen 220 of the application on the entire screen. Displaying the screen as shown in diagram 211, i.e., the first execution screen 220, is performed to execute an application in the mobile device, according to the general procedure.

During the display of the first execution screen 220 as shown in diagram 211, an event for calling a mode switching item 240 occurs on a region on the first execution screen 220. The mode switching item 240 refers to an item for switching an application executed in a full mode to execution in a mini mode. The mode switching item 240 may be toggled according to a user's input. For example, when the mode switching item 240 is not displayed on the screen as shown in diagram 211, it can appear on the screen according to a user's input as shown in diagram 213. Likewise, when the mode switching item 240 is displayed on the screen as shown in diagram 213, it may disappear according to a user's input as shown in diagram 211.

As shown in diagram 213, the mode switching item 240 may appear on the execution screen 220 according to a calling event. The calling event refers to an event that occurs when the user touches a region where the mode switching item 240 is allocated and hidden (e.g., at the top right of the screen shown in diagram 213). The calling event may be achieved by at least one of a tap, a drag, a sweep, a flick, etc. Alternatively, the calling event may also be achieved when the user touches a preset hot key for activating the mode switching item 240.

The mode switching item 240 may be displayed in an activated/deactivated state in a preset region on the screen. For example, the mode switching item 240 is not shown in the preset region, as shown in diagram 211, and is shown when the user creates the calling event, as shown in diagram 213. The mode switching item 240 may be provided as an icon in the bottom or top area on the screen. The mode switching item 240 may be provided to the application execution screens respectively.

During the display of the first execution screen 220 showing the mode switching item 240 as shown in diagram 213, when a user's event for selection occurs on the mode switching item 240, the application is executed in a mini mode as shown in diagram 215. When the application is executed in a mini mode, the first execution screen 220 in a full mode is omitted and instead the application executed in a mini mode appears on a second execution screen 260. The second execution screen 260 may be displayed on a preset region, for example, the top, bottom, right, left, top right or left, bottom right or left, middle, or the like.

The mode switching item 240 may switch between full and mini modes, with respect to one application. That is, the mode switching item 240 switches an executed application in a full mode to execution in a mini mode. It is preferable that, when switching modes via the mode switching item 240, a first execution screen 220 of the application executed in a full mode is removed and only a second execution screen 260 of the application executed in a mini mode is displayed. However, it should be understood that the invention is not so limited. For example, the system may also be implemented, according to a user's settings, in such a way that, when switching an executed application in a full mode to execution in a mini mode via the mode switching item 240, the execution screen of the application executed in the full mode may not be removed, and thus the application execution screens in the full and mini modes can be displayed on the display unit.

Although, in the exemplary embodiment shown in FIG. 2B, the mode switching item 240 is implemented in a toggle mode, it should be understood that the invention is not so limited. For example, the mode switching item 240 may be fixedly displayed on a preset region on the application execution screen in a full mode according to a user's settings, which is called an ordinary mode. That is, when an application is executed in a full mode, the mode switching item 240 is also displayed on a region on the application execution screen. In addition, although, in the exemplary embodiment shown in FIG. 2B, when switching a full mode to a mini mode via the mode switching item 240, the mode switching item 240 is removed from the execution screen in the mini mode, it should be understood that the invention is not so limited. For example, during the process, the mode switching item 240 may be retained on the execution screen in the mini mode. In that case, the user can operate the mode switching item 240 in the execution screen in the mini mode to switch the application execution screen in the mini mode to the full mode.

Figure 3:
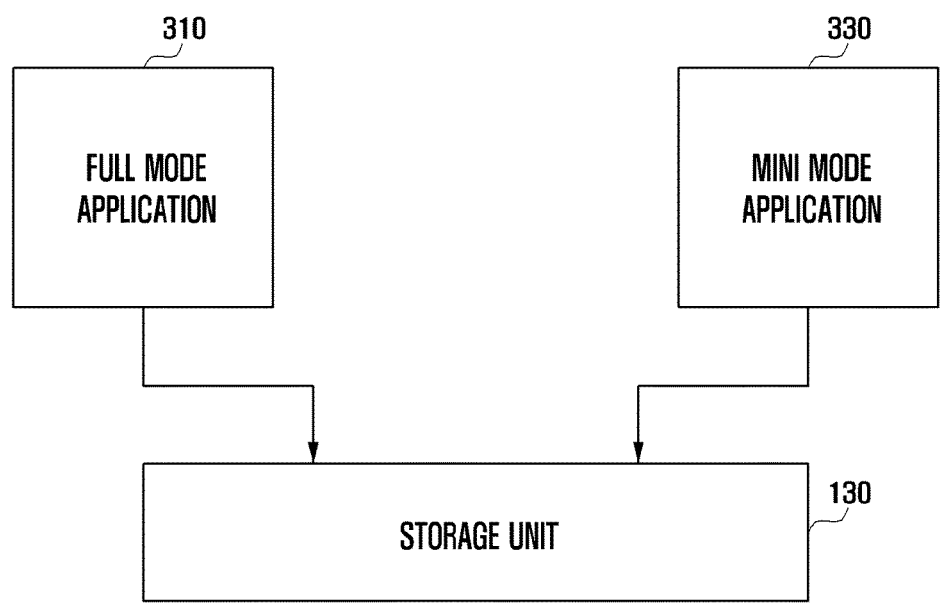
FIG. 3 illustrates a view that describes a process for operating an application in mini and full modes according to an exemplary embodiment of the present invention.

FIG. 3 illustrates a view that describes a process for operating an application in mini and full modes according to an exemplary embodiment of the present invention.

Referring to FIG. 3, an application 310 executed in a full mode (or a full mode application 310) and an application 330 executed in a mini mode (or a mini mode application 330) are switchable or simultaneously executable. The full mode application 310 and mini mode application 330 are executed in one process or may be executed in different processes.

The full mode application 310 and mini mode application 330 are commonly allocated to the same data storage area, so that information (data) is shared with each other in real time. That is, the controller 150 can share data stored in the area in the storage unit 130, storing data created via the full mode application 310, and the area in the storage unit 130, storing data created via the mini mode application 330. Therefore, the mini mode application 330 can use the data created when an application 310 is executed in a full mode, and vice versa.

When the full mode application 310 and the mini mode application 330 are simultaneously executed, the respective execution screens can simultaneously display the same data stored in the storage unit 130. When data simultaneously displayed on the execution screens in full and mini modes is modified in one of the execution screens or new data is input to one of the execution screens, the modification of data or the input of new data is also applied to the other execution screen in real time.

For example, when an application for providing a memo function, i.e., a memo application, is executed in a full mode and the first memo data is created, the first memo data may be stored in a memo storage area for a memo function allocated to the storage unit 130. Likewise, the second memo data, created when a memo application is executed in a mini mode, may be stored in the memo storage area. In that case, the first memo data can be loaded to perform a reading/writing operation when the memo application is executed in a full mode or in a mini mode. Likewise, the second memo data can also be loaded to perform the same operation as the first memo data.

Figure 4:
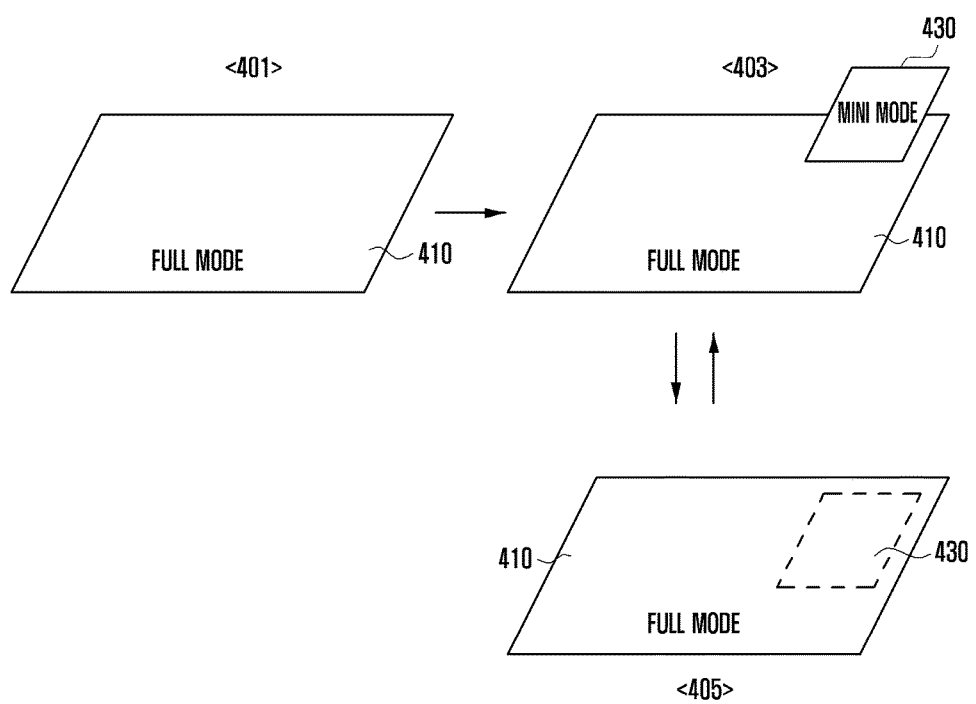
FIG. 4 illustrates a view that describes a process when a mobile device operates an application in mini and full modes according to an exemplary embodiment of the present invention.

FIG. 4 illustrates a view that describes a process when a mobile device operates an application in mini and full modes according to an exemplary embodiment of the present invention.

Referring to FIG. 4, s shown in diagram 401, it is assumed that, when the mobile device executes an application in a full mode, it displays a first execution screen 410 of the application on the entire screen. Displaying the screen of diagram 401, i.e., the first execution screen 410, is performed to execute an application in the mobile device, according to the general procedure.

During the display of the first execution screen 410 as shown in diagram 401, an event occurs that executes the application in a mini mode. In that case, a second execution screen 430 of the application is displayed as a mini screen on the first execution screen 410 as shown in diagram 403, according to the mini mode executing event. The first 410 and second 430 execution screens may display the same application in full and mini modes, operated via the same process. Alternatively, the first 410 and second 430 execution screens may be execution screens where first and second applications are executed in full and mini modes, respectively, via different processes.

For example, when application A is executed in a full mode and the first execution screen is thus displayed as the entire screen on the display unit 110, a mini mode of application A can also be executed, so that the second execution screen is displayed as a mini screen. Likewise, when application A is executed in a full mode and the execution screen of application A is thus displayed as the entire screen on the display unit 110, a mini mode of application B can be executed, so that the execution screen of application B is displayed as a mini screen. FIG. 4 shows screens where one application is executed in full and mini modes.

FIG. 4 shows an exemplary embodiment of the invention where, during the operation of an application in a full mode, when the application or another application is executed in a mini mode, the execution screen of the corresponding application in mini mode is arranged on the highest layer on the display unit 110. It should be, however, understood that the invention is not so limited. For example, the layer arrangement of execution screens may be altered according to the user's settings.

During the display of the first execution screen 410 and the second execution screen 430 thereon as shown in diagram 403, when a user's event for switching modes occurs, a mode switching operation is performed in such a way to switch between the layers of the first 410 and second 430 execution screens so that the first execution screen 410 in a full mode is displayed on the upper screen and the second execution screen 430 in a mini mode is lowered, as a background screen, under the first execution screen 410, as shown in diagram 405. Likewise, during the display of the first execution screen 410 and the second execution screen 430 thereunder as shown in diagram 405, when a user's event for switching modes occurs, a mode switching operation is also performed in such a way to switch between the layers of the first 410 and second 430 execution screens so that the first execution screen 410 in a full mode is displayed on a lower screen and the second execution screen 430 in a mini mode is displayed on the first execution screen 410, as shown in diagram 403.

In an exemplary embodiment of the invention, as shown in FIG. 4, the mode switching event switches the layers of execution screens between a full mode and a mini mode, and is implemented with a preset touch-based gesture, an operation to a preset hot key, etc.

Although the exemplary embodiment shown in FIG. 4 is implemented in such a way to display execution screens when one application is executed in full and mini modes and to perform a mode switching operation of the execution screen between a full mode and a mini mode, it should be understood that the invention is not so limited. For example, it may be modified in such a way that the execution screen in a mini mode is always displayed on the upper layer, according to a presetting. Alternatively, it may also be modified in such a way that, when a user's event for switching modes occurs, a process for displaying an execution screen in a full mode is interrupted such that it is not displayed, but instead only a process is executed to display an execution screen in a mini mode, according to a presetting. That is, an exemplary system and method can support a mode switching operation for displaying an execution screen in only one mode and a mode switching operation for simultaneously displaying execution screens in full and mini modes.

Figure 5:
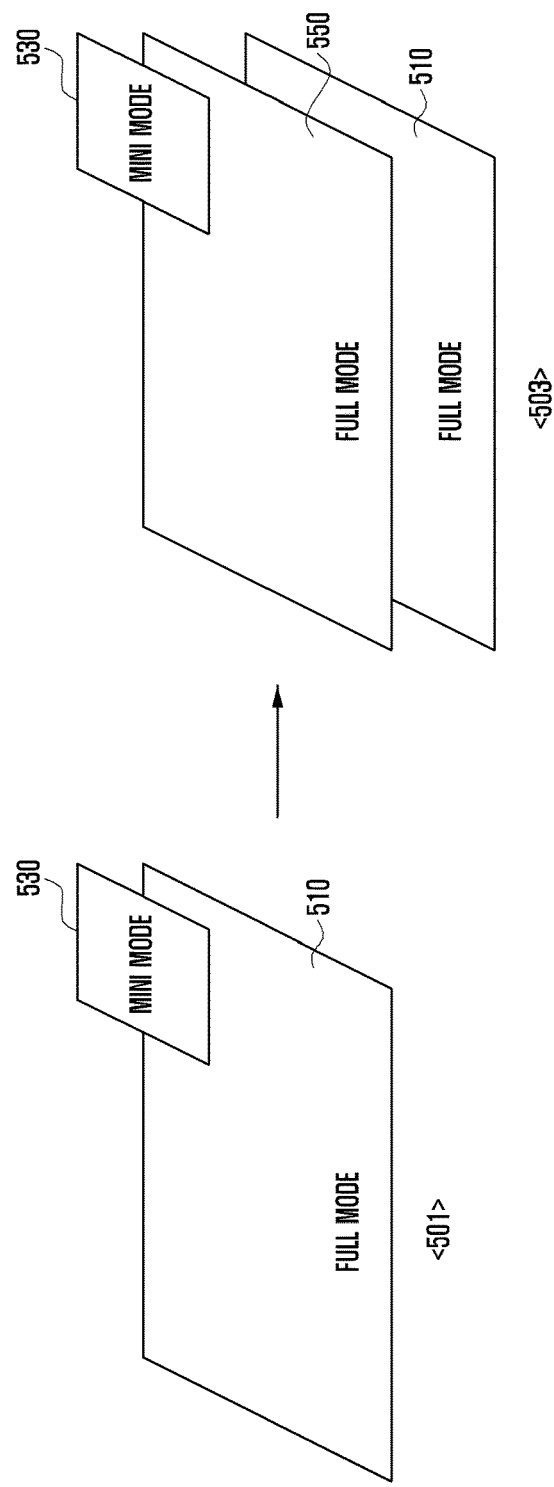
FIG. 5 illustrates a view that describes a process when a mobile device operates a number of applications in mini and full modes according to an exemplary embodiment of the present invention.
Figure 6:
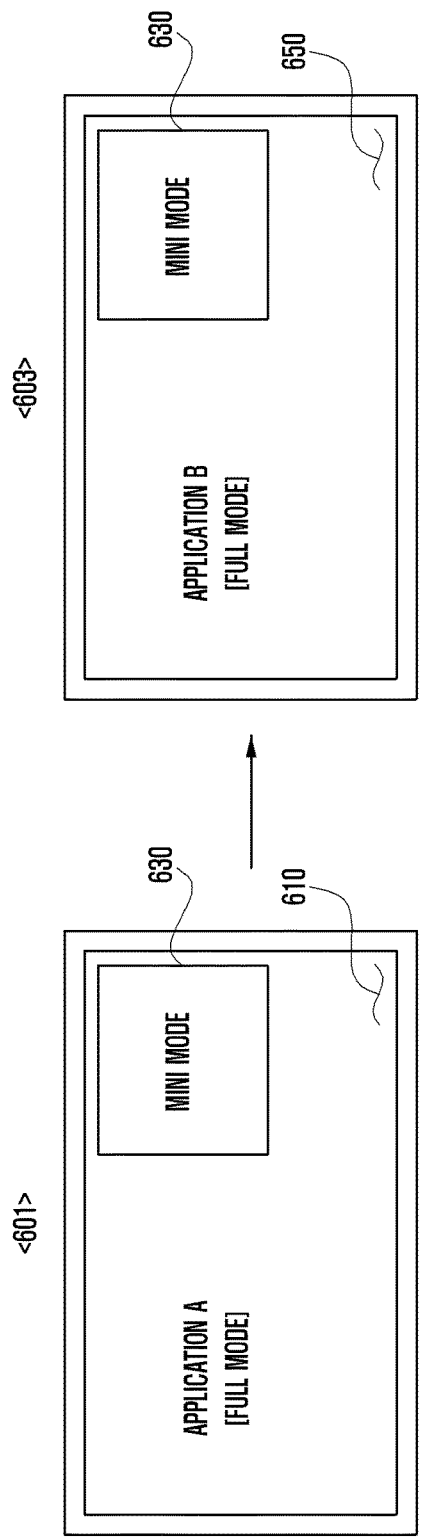
FIG. 6 illustrates screens corresponding to the modes shown in FIG. 5 according to an exemplary embodiment of the present invention.

FIG. 5 illustrates a view that describes a process when a mobile device operates a number of applications in mini and full modes according to an exemplary embodiment of the present invention. FIG. 6 illustrates screens corresponding to the modes shown in FIG. 5 according to an exemplary embodiment of the present invention.

Referring to FIGS. 5 and 6, as shown in diagram 501, it is assumed that application A is executed in full and mini modes and the execution screens 510 and 530 are displayed. In an exemplary embodiment of the invention, it is assumed that the execution screen in a mini mode is always displayed on an upper layer compared to the execution screen in a full mode. Therefore, the second execution screen 530 of application A executed in a mini mode is always on the first execution screen 510 of application A executed in a full mode. This operation is illustrated as shown in diagram 601 of FIG. 6. That is, the first execution screen 610 created when application A is executed in a full mode is displayed as the entire screen on the display unit 110 and the second execution screen 630 created when application A is executed in a mini mode is displayed as a mini screen on the first execution screen 610.

During the display as shown in diagram 501, the user operates the mobile device in a multitasking mode and executes application B in a full or mini mode. The exemplary embodiment of the invention is described in such a way that application B is executed in a full mode. When a user's event occurs on the screen as shown in diagram 501 and thus application B is executed in a full mode, the display is configured as shown in diagram 503 in which a second execution screen 530 of application A executed in a mini mode is displayed on the highest layer, a third execution screen 550 of application B in a full mode is displayed as the entire screen under the second execution screen 530, and the first execution screen 510 of application A in a full mode is displayed on the lowest layer under the third execution screen 550. That is, the entire screen is switched from the first execution screen 510 of application A in a full mode to the third execution screen 550 of application B in a full mode. This operation is illustrated as shown in diagram 603. That is, the first execution screen 610 of application A in a full mode disappears from the display unit 110, the third execution screen 650 of application B in a full mode is displayed as the entire screen, and the second execution screen 630 of application A in a mini mode is displayed as a mini screen on the third execution screen 650.

As shown in FIGS. 5 and 6, while operating a first application in full and mini modes on one screen, a second application may be executed in a full mode. In that case, the first execution screen in a full mode is hidden or paused.

During this state, when resources such as memory are insufficient, the resources related to the full mode for the first application executed in the lowest priority is first removed from the process. Although the resources related to the full mode of the first application are removed from the process, the information, data and primary functions, used in the full mode for the first execution screen, are succeeded to the mini mode for the first application. That is, while an application is executed in both full and mini modes, when one of the modes is interrupted, the information, data, and primary functions, used in the interrupted mode, are automatically shared by the resources related to the other mode in execution. In addition, the second application in a full mode can be separately operated from the first application in a mini mode.

As described above, when an application is executed to perform the same operation in mini and full modes and one of the modes is interrupted, the system can share data between the full and mini modes of a corresponding application, and also update the screen. In addition, when an application executes different operations in a full mode and a mini mode, the system can share, in real time, data between the full and mini modes of a corresponding application, and also update the screen.

Figure 7A:
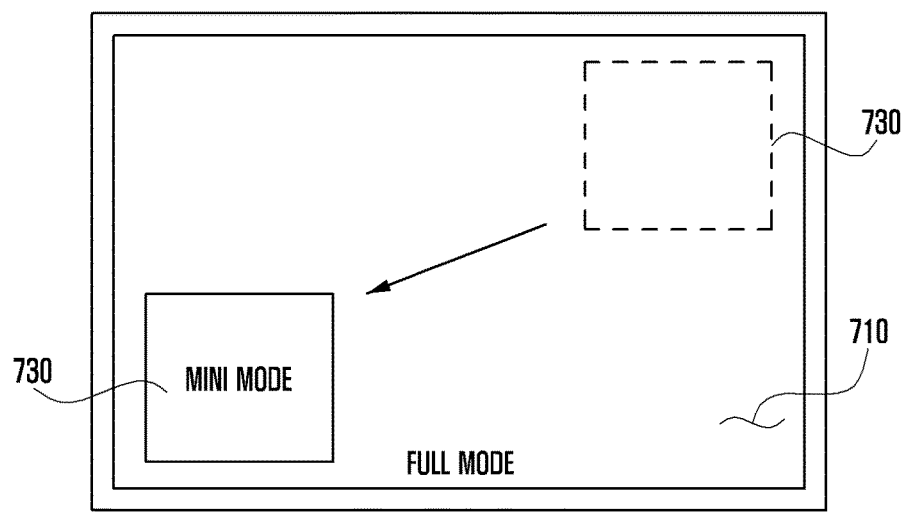
FIGS. 7A and 7B illustrate screens when a mobile device executes an application in a mini mode according to an exemplary embodiment of the present invention.
Figure 7B:
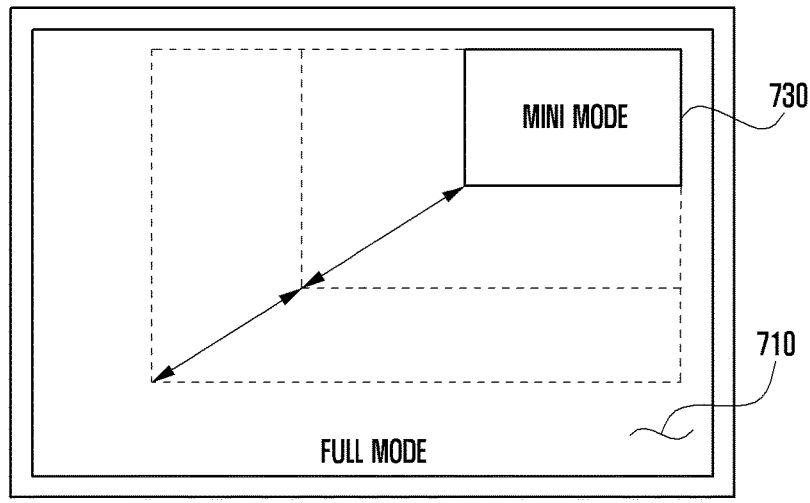

FIGS. 7A and 7B illustrate screens when a mobile device executes an application in a mini mode according to an exemplary embodiment of the present invention.

Referring to FIG. 7A, a mini mode execution screen of an application may be displayed as the entire screen on a full mode execution screen of the application or another application. Alternatively, an application may be executed only in a mini mode, displaying the execution screen. The mini mode execution screen of an application may be displayed on the display unit 110 in the area.

For example, when the mobile device displays a second execution screen 730 of a mini mode application on a first execution screen 710 of a full mode application, the user can create events for moving the second execution screen 730 on the display unit 110 in the area. During the movement of the second execution screen 730, the mobile device can retain the first execution screen 710 of the full mode application via the multitasking function.

In an exemplary embodiment of the invention, the movement events may be achieved via touch-based gestures (e.g., a move, a sweep, a flick, a drag, etc.) or via key-based events (e.g., the operation of direction keys).

Referring to FIG. 7B, a screen of an application executed in a mini mode is displayed on a screen of the application executed in full mode or on a screen of another application execution screen in a full mode, which is displayed on the entire screen of the display unit. Alternatively, only a screen of an application executed in a mini mode is displayed on the display unit. As such, the execution screen of the mini mode application can be enlarged or reduced in the area of the display unit 110 according to the user's adjustment events.

For example, as shown in FIG. 7B, when a second execution screen 730 of a mini mode application is displayed on a first execution screen 710 of a full mode application, the second execution screen 730 can be enlarged or reduced within the area of the display unit 110, according to the user's adjustment event. While the second execution screen 730 is altered in size, the execution screen of the full mode application may be retained via the multitasking function.

The size adjustment event may be achieved by touch-based events (e.g., a single-touch such as a drag, multi-touches such as a pinch zoom) or mechanical key-based events (e.g., selection or direction keys).

Figure 8:
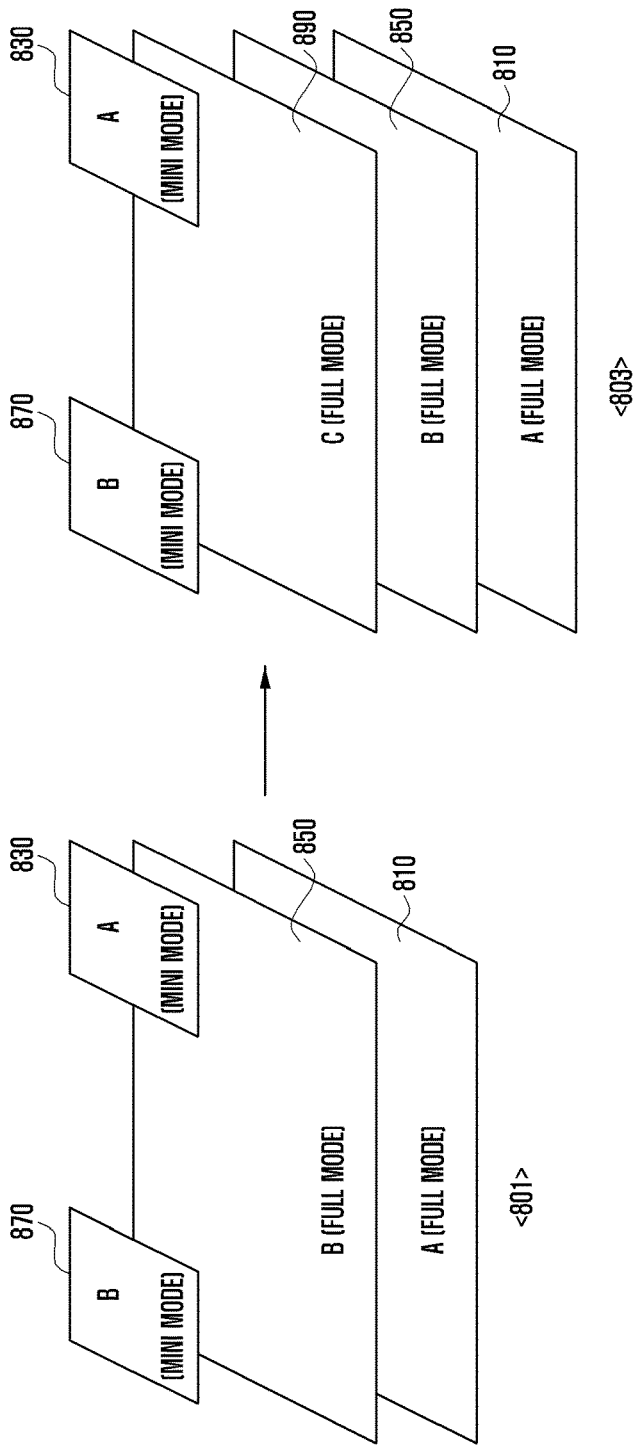
FIG. 8 illustrates a view that describes a process where a mobile device executes a number of applications in mini modes according to an exemplary embodiment of the present invention.

FIG. 8 illustrates a view that describes a process where a mobile device executes a number of applications in mini modes according to an exemplary embodiment of the present invention.

Referring to FIG. 8, as shown in diagram 801, it is assumed that applications A and B are executed in full and mini modes, displaying the execution screens 810, 830, 850, and 870. In an exemplary embodiment of the invention, the mini mode execution screen is always on an upper layer compared to the full mode execution screen. For example, as shown in diagram 801, the full mode execution screen 850 of application B is provided as the entire screen, and the mini mode execution screens 830 and 870 of applications A and B are provided as mini screens on the full mode execution screen 850. The mini execution screens 830 and 870 may be superimposed on each other in such a way that the latest one of the mini mode execution screens is placed on the other.

During the display as shown in diagram 801, the user can execute application C in a full or mini mode, via the multitasking function. The exemplary embodiment of the invention, as shown in diagram 803, is described in such a way that application C is executed in a full mode according to the user created event. The mini mode execution screens 830 and 870 of applications A and B are placed on a higher layer than the other execution screens. That is, the full mode execution screen 890 of application C is located as the entire screen under the mini mode execution screens 830 and 870. The full mode execution screens 850 and 810 of applications B and A are located as the entire screen, in order, under the full mode execution screen 890 of application C. When the full mode execution screen 850 of application B is displayed as the entire screen on the display unit 110, it may be switched, in position, with the full mode execution screen 890 of application C. In that case, the full mode execution screen 850 of application B is hidden and the full mode execution screen 890 of application C is displayed as the entire screen on the display unit 110. During this process, the mini mode execution screens 830 and 870 of applications A and B are retained as mini screens above the full mode execution screen 890.

As described above, the system and method according to exemplary embodiments of the invention can execute a number of applications in mini modes on one screen of the display unit 110. That is, the system and method can display a number of mini mode execution screens of applications on one screen of the display unit 110, and can independently control the respective functions of the applications executed in mini modes. In addition, when application C is executed in a full mode, the full mode execution screen 890 of application B having been executed before the execution of application C is hidden or paused.

During this process, when the mobile device detects a lack of resources such as memory etc., resources related to application A that is executed in a full mode, with the lowest priority, are first removed from the process, and then resources related to application B that is executed in a full mode with the second lowest priority are removed. Although resources related to applications A and B executed in full modes are removed from the process, the information, data, and primary functions, used in a full mode, can still be used in the execution of applications A and B in mini mode. That is, when one of the two modes in which an application is executed is interrupted, the information, data, and primary function that have been used in one mode by the interruption are automatically shared with and used in the other mode. As such, a number of applications executed in mini modes do not affect the operations of applications executed in full modes or are not affected from the full mode applications. That is, a number of applications executed in mini modes can be independently controlled.

While executing a number of applications, e.g., applications A and B, in mini modes, an application may perform an operation in a mini mode and a full mode. When one of the mini and full modes is interrupted, the system can share data between the full and mini modes of a corresponding application, and also update the screen. In addition, when an application executes different operations in a full mode and a mini mode, the system can share, in real time, data between the full and mini modes of a corresponding application, and also update the screen.

Figure 9:
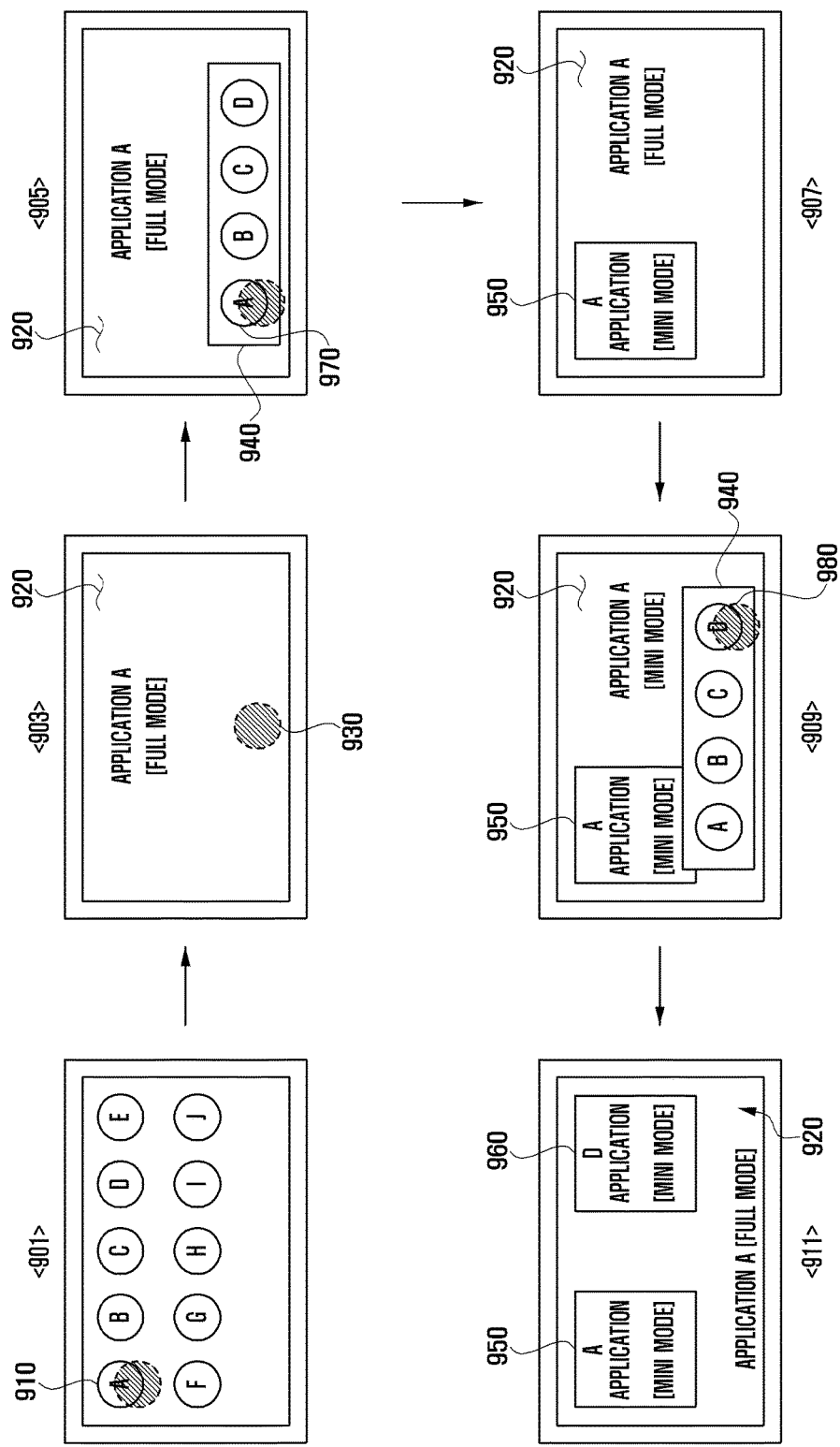
FIG. 9 illustrates a view that describes a process where a mobile device executes an application in mini and full modes according to an exemplary embodiment of the present invention.

FIG. 9 illustrates a view that describes a process where a mobile device executes an application in mini and full modes according to an exemplary embodiment of the present invention.

Referring to FIG. 9, as shown in diagram 901, the mobile device displays items for executing the applications (hereinafter called first shortcut items) on the screen (e.g., home screen). The shortcut items correspond to the applications of the mobile device. New shortcut items may be created on the screen according to the user's settings. In an exemplary embodiment of the invention, shortcut items serve to execute the corresponding applications in a full mode. As shown in FIG. 9, the exemplary embodiment is described with ten shortcut items for executing applications, A, B, . . . , J, in a full mode. However, it is to be understood that this number of shortcut items and executing applications is merely for explanation and not to be considered limiting.

When the applications are executed via the shortcut items, they can be activated in a full or mini mode according to types of user created events. For example, when the user creates a first event (e.g., a tap, a double tap, etc.), preset to execute an application in a full mode, on a shortcut item, an application corresponding to the shortcut item is executed in a full mode and the execution screen is thus displayed as the entire screen on the display unit 110. Likewise, when the user creates a second event (e.g., a tap, a double tap, a gesture, etc.), preset to execute an application in a mini mode, on a shortcut item, an application corresponding to the shortcut item is executed in a mini mode and the execution screen is thus displayed as a mini screen on the display unit 110. In an exemplary embodiment of the invention, the first and second events are set as different types of events. As an example of the second event, a gesture event may be created by touching and dragging a shortcut item by drawing a preset path (e.g., a diagram, a letter shape, or the like).

During this process, the user creates an event on one of the first shortcut items, 910, as shown in diagram 901. The application is executed in a full mode and the execution screen 920 is thus displayed as the entire screen on the display unit 110, as shown in diagram 903. For example, when the user creates an event on a shortcut item 910 for executing application A from among the first shortcut items, application A is executed in a full mode and the execution screen 920 is displayed as the entire screen on the display unit 110.

During the display as shown in diagram 903, the user creates an event for calling a tray that includes items for executing applications in a mini mode (hereinafter called a second shortcut items). In an exemplary embodiment of the invention, the tray calling event may be created on a preset region in a tray area in the area of the display unit 110. For example, as shown in diagram 903, a tray calling event may be created on a region 930 in the bottom of the full mode execution screen 920. When a tray calling event is created on a region 930, a tray 940 including at least one second shortcut items appears on the execution screen 920 as shown in diagram 905. Although the example shows that the tray 940 appears with an outline according to a user's input event, it should be understood that the invention is not limited thereto. For example, the tray 940 may appear, without an outline, on a preset region showing the second shortcut items, according to a user's input event.

During the display as shown in diagram 905, the user creates an event on one of the second shortcut items, 970, in the tray 940. The application is executed in a mini mode, and the execution screen 950 is displayed as a mini screen on the display unit 110, as shown in diagram 907. For example, when the user creates an event on a shortcut item 970 for executing application A from among the second shortcut items in the tray 940, application A is executed in a mini mode and the execution screen 950 is displayed as a mini screen on the display unit 110. The mini mode execution screen 950 of application A may be displayed on the full mode execution screen 920 that has been displayed according to the execution of application A. When the mini mode execution screen 950 of application A is provided, the tray 940 may be retained or automatically hidden according to the settings. The exemplary embodiment of the invention, as shown in diagram 907, is implemented in such a way that the tray 940 is automatically hidden. On the other hand, the example may be modified in such a way that the tray 940 may be retained when the mini mode execution screen 950 of application A is provided, and hidden according to a user created event.

During the display as shown in diagram 907, the user operates the display unit 110 to display the tray 940 on the display unit 110, as shown in diagram 909, according to the retaining mode or by calling, if the tray 940 was hidden, the tray 940 via the user's additional event as described above. After that, the user creates an event on one shortcut item 980 of the second shortcut items in the tray 940, in order to allow the mobile device to operate the multitasking function. In that case, as shown in diagram 911, the application corresponding to the user's selected shortcut item 980 is executed in a mini mode and the execution screen 960 is thus displayed as a mini screen on the display unit 110. For example, when the user creates an event on a shortcut item 980 for executing application D from among the second shortcut items in the tray 940, application D is executed in a mini mode and the mini mode execution screen 960 is displayed as a mini screen on the display unit 110. The mini mode execution screen 960 of application D may be displayed on the full mode execution screen 920 that has been displayed according to the execution of application A. During this process, the mini mode execution screen 950 of application A may be retained. Although the example shown in FIG. 9 is implemented in such a way that the mini mode execution screens 950 and 960 of applications A and D are separately displayed on the same layer, it may be modified in such a way that the mini mode execution screen 960 of application D that has been recently executed is superimposed and displayed on a higher layer than the mini mode execution screen 950 of application A, where the layer of the mini mode execution screen 960 is superimposed on that of the mini mode execution screen 950.

Figure 10:
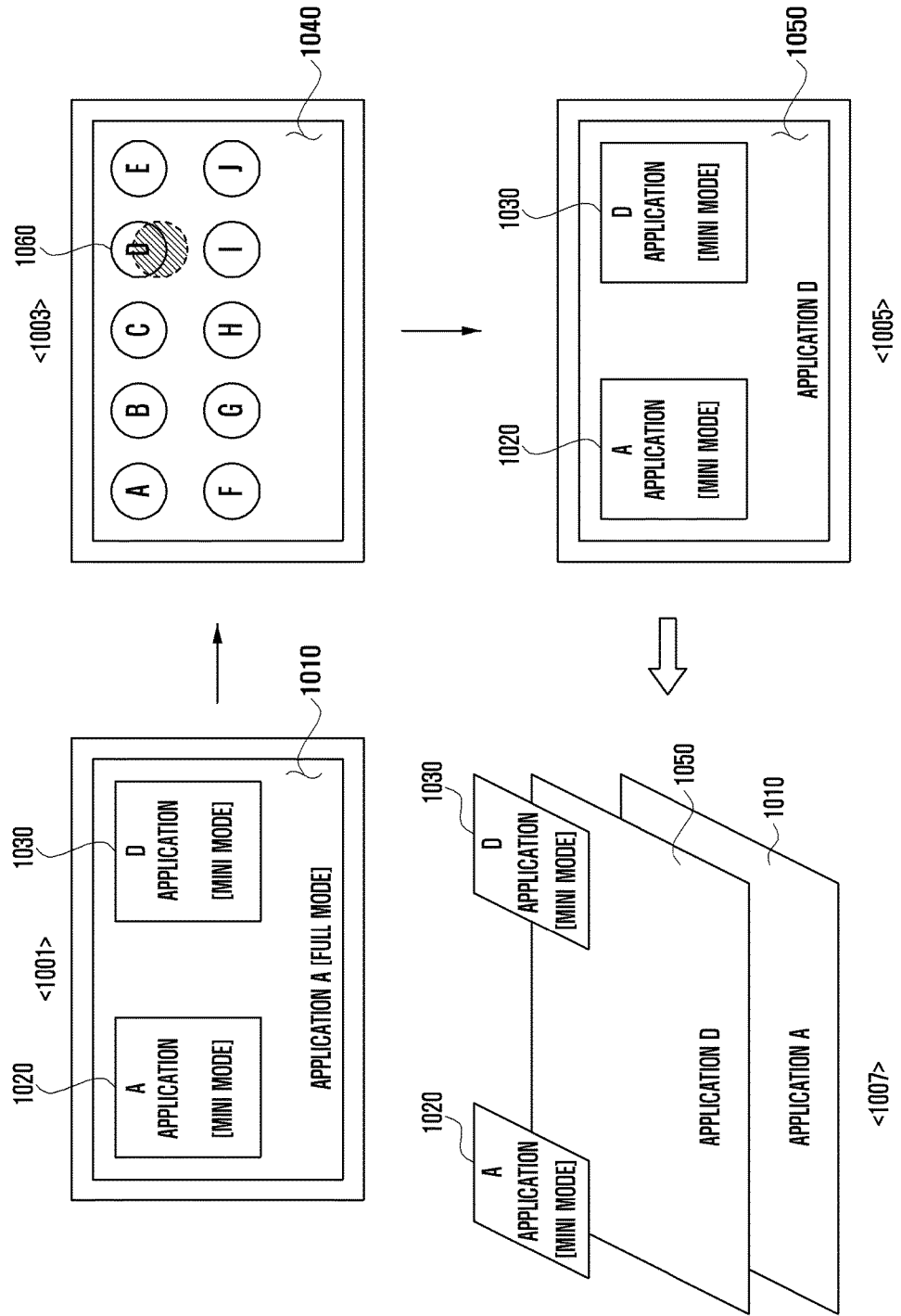
FIG. 10 illustrates a view that describes a process where a mobile device executes an application in mini and full modes according to an exemplary embodiment of the present invention.

FIG. 10 illustrates a view that describes a process where a mobile device executes an application in mini and full modes according to an exemplary embodiment of the present invention.

Referring to FIG. 10, as shown in diagram 1001, application A is executed in full and mini modes, and the full mode execution screen 1010 and the mini mode execution screen 1020 are thus displayed on the display unit 110. In addition, application D is executed in a mini mode and the mini mode execution screen 1030 is displayed on the display unit 110.

During the display as shown in diagram 1001, the user creates an event for switching to a screen (e.g., a home screen) showing a list of items for executing applications. In an exemplary embodiment of the invention, the switching event is achieved via a touch-based event, a key-based event, etc. For example, the switching event may be achieved by tapping an item on an execution screen, making a preset gesture, operating a home key, or the like. According to the user created event, the home screen 1040 including a number of first shortcut items for executing applications is displayed as shown in diagram 1003. During this process, application A, executed in full and mini modes, and application D, executed in a mini mode, are still operated as background applications. Although the example shown in FIG. 10 is implemented in such a way that, when an event for switching a screen to a home screen occurs, the mini mode execution screens 1020 and 1030 are processed as backgrounds, it may be modified in such a way that the mini mode execution screen may be still displayed on the home screen.

During the display of a home screen as shown in diagram 1003, the user creates an event on one of the first shortcut items, 1060. An application corresponding to the user's selected shortcut item 1060 is executed in a full mode and the execution screen 1050 is displayed as the entire screen on the display unit 110 as shown in diagram 1005. For example, when the user creates an event on a shortcut item 1060 for executing application D from among the first shortcut items, application D is executed in a full mode and the full mode execution screen 1050 is displayed as the entire screen on the display unit 110. This can be illustrated as a layer configuration as shown in diagram 1007.

Referring to diagram 1007, mini mode execution screens 1020 and 1030 of applications A and D are displayed on the highest layer, the full mode execution screen 1050 of application D is displayed as the entire screen on a lower layer than the mini mode execution screens 1020 and 1030, and the full mode execution screen 1010 of application A is displayed as the entire screen on the lowest layer. The full mode execution screen 1010 of application A is switched, in position, with the full mode execution screen 1050 of application D. That is, the full mode execution screen 1010 that has been displayed according to the execution of application A disappears on the display unit 110, and instead the full mode execution screen 1050 of application D appears as the entire screen on the display unit 110. In addition, the mini mode execution screen 1020 of application A and the mini mode execution screen 1030 of application D are retained on the execution screen 1050.

FIG. 10 shows an example where application D that has been executed in a mini mode is further executed in a full mode. However, the example may also be modified in such a way that, when an application has been executed in full and mini modes, it can also be executed in opposite modes by switching the modes. Alternatively, when an application is executed in full and mini modes, another application is also executed in a full mode and/or a mini mode.

Figure 11:
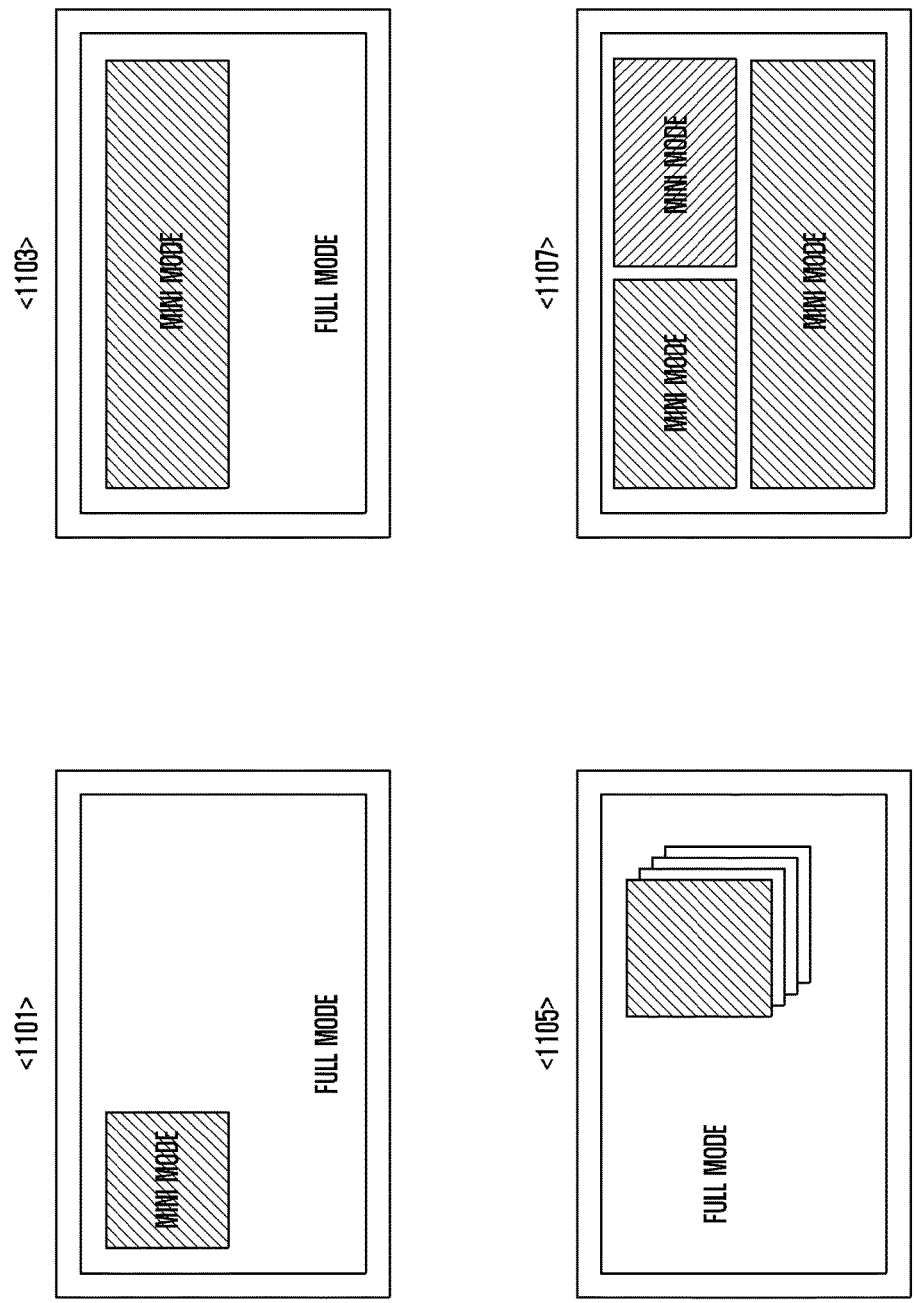
FIG. 11 illustrates a view that describes an arrangement of screens on which an application is executed in a mini mode in a mobile device according to an exemplary embodiment of the present invention.

FIG. 11 illustrates a view that describes an arrangement of screens on which an application is executed in a mini mode in a mobile device according to an exemplary embodiment of the present invention.

Referring to FIG. 11, when an application is executed in a mini mode, the execution screen may be altered in shape according to the type of application. For example, as shown in diagrams 1101 and 1103, the execution screen of an application may be displayed as various shapes of M×N (M and N are integers), such as a regular quadrilateral, a rectangle, etc., according to the functions and user interfaces of the application. In addition, the mini mode execution screen may be displayed on a region or on a preset region according to a user's setting.

When a number of applications are executed in mini modes, the execution screens may be displayed in a variety of arrangements. For example, as shown in diagram 1105, the execution screens of a number of applications executed in mini modes are arranged and superimposed according to the order of execution of the applications. Alternatively, as shown in diagram 1107, the execution screens of applications are allocated to regions in the area of the display unit 110, and displayed in an arrangement of tiles. In addition, the mini mode execution screens may be moved in the screen area of the display unit 110 according to the user created events.

Figure 12:
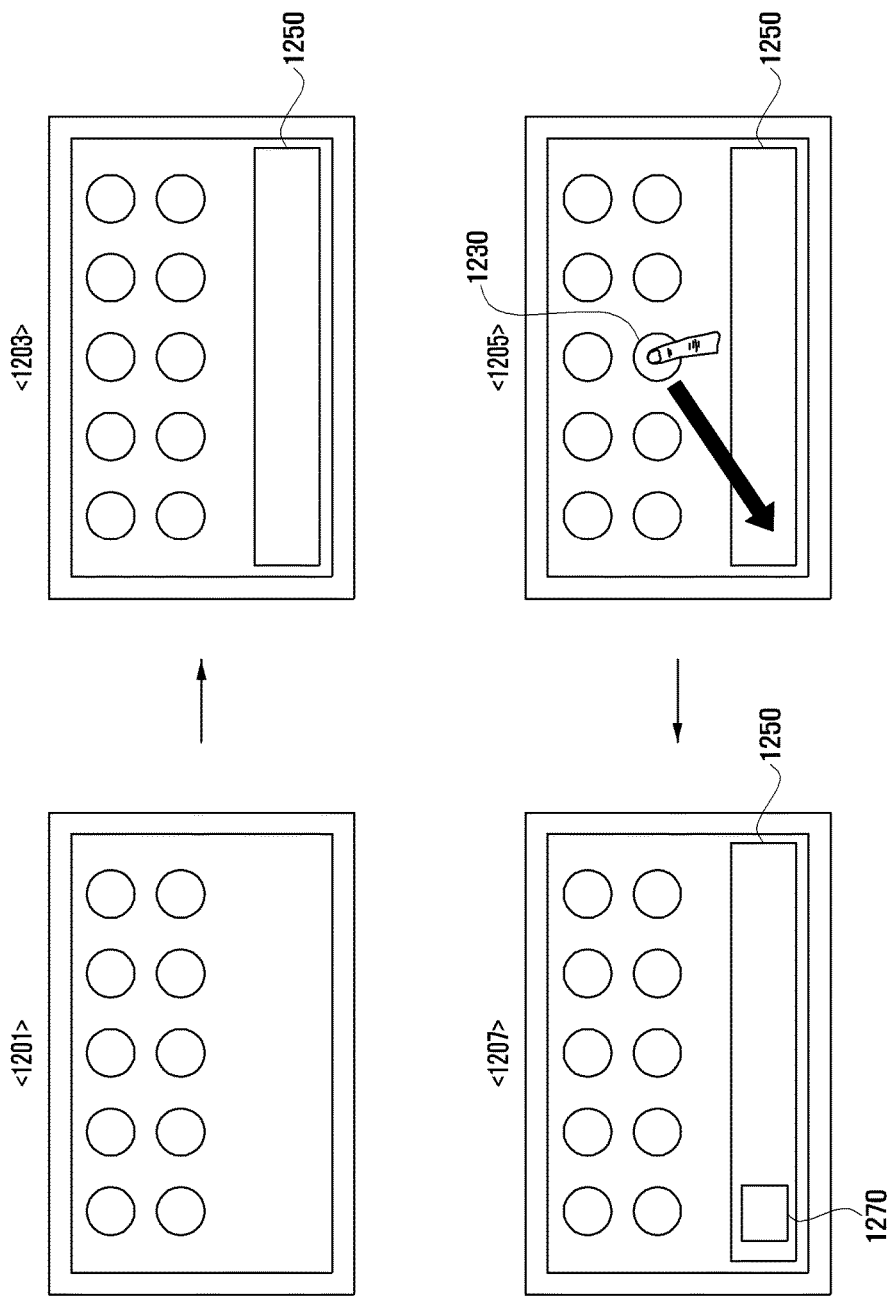
FIG. 12 illustrates a view that describes a process for setting a second shortcut item for operating an application in a mini mode in a mobile device according to an exemplary embodiment of the present invention.

FIG. 12 illustrates a view that describes a process for setting a second shortcut item for operating an application in a mini mode in a mobile device according to an exemplary embodiment of the present invention.

Referring to FIG. 12, as shown in diagram 1201, it is assumed that the mobile device displays a home screen. The user can create a setting event for registering a second shortcut item for executing an application in a mini mode on the home screen. In an exemplary embodiment of the invention, the setting event includes a touch-based event and a key-based event. For example, the setting event may be achieved by making a preset gesture, operating a preset hot key, etc. In addition, the setting event may also be achieved by operating a menu for setting a second shortcut item.

The display unit 110 displays a tray 1250 on the home screen, as shown in diagram 1203. Although the example is implemented in such a way that the tray 1250 is empty, if there is at least one second shortcut item that has been set, it includes the second shortcut items.

During the display as shown in diagram 1203, the user creates an event for registering one of the first shortcut items, 1230, in the tray 1250 as a second shortcut item, For example, as shown in diagram 1205, the user creates a registration event that selects a shortcut item of an application, 1230, from among the first shortcut items on the home screen, and moves it in the tray 1250. In an exemplary embodiment of the invention, the registration event may be a drag and drop, a sweep, a flick, a touch and hold, etc.

According to the registration event, as shown in diagram 1207, a second shortcut item 1270 for executing a corresponding application in a mini mode is created and displayed in the tray 1250. The first shortcut item 1230 and the second shortcut item 1270, corresponding to the same application, may be shaped as the same shape or different shapes. The tray 1250 includes a number of second shortcut items via the procedure as described above.

As described above, the system and method according to exemplary embodiments of the invention can operate all applications installed in the mobile device as mini mode applications. The second shortcut items for executing applications in mini modes may be registered in the tray 1250, with different shapes from the first shortcut items for executing applications in full modes. For example, the first shortcut item for executing an application in a full mode and the second shortcut item for executing an application in a mini mode may have different shapes, and the second shortcut item may be registered in the tray 1250. It should be understood that the first shortcut items may be set to execute corresponding applications in a full mode or a mini mode according to types of user created events.

The tray 1250 including the second shortcut items can be activated or deactivated on all execution screens of applications as well as a home screen. That is, the tray 1250 may be superimposed or disappear on an execution screen, according to user created events.

Figure 13:
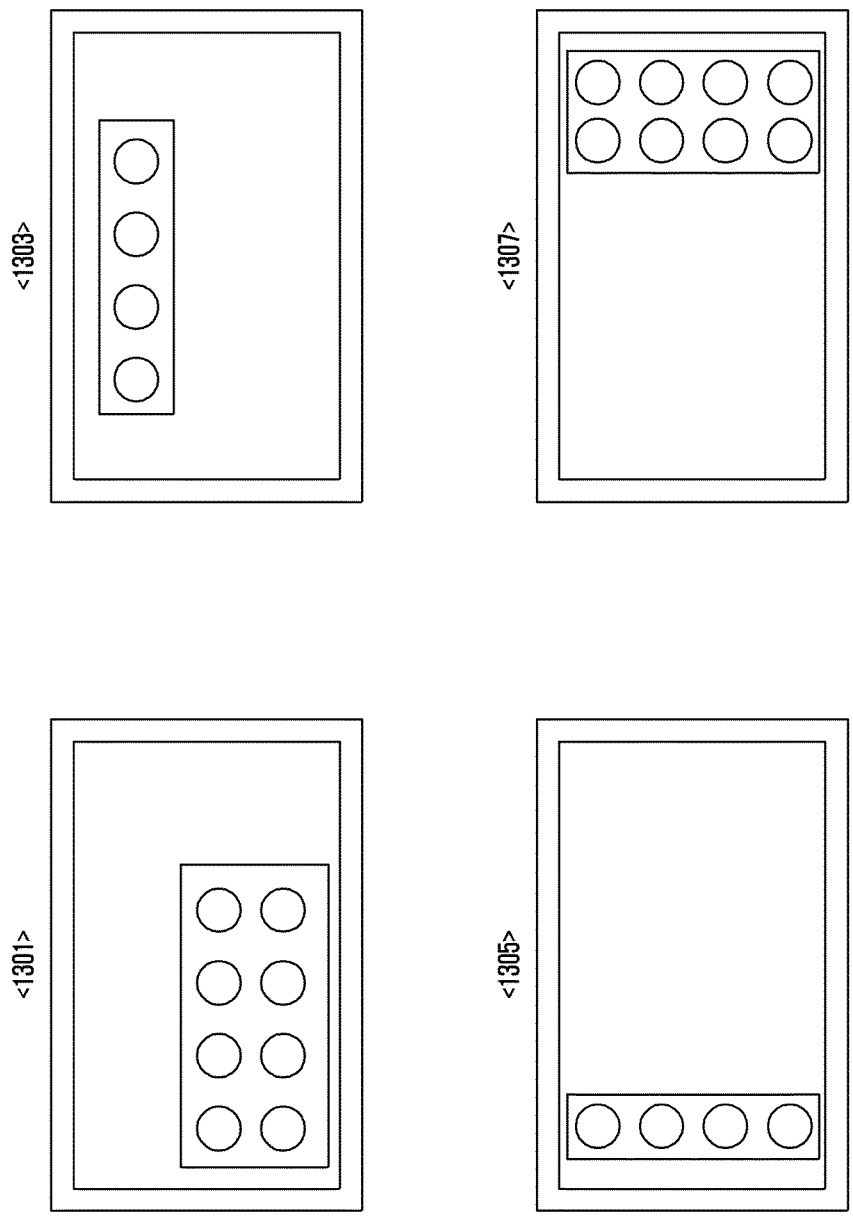
FIG. 13 illustrates screens that describe an arrangement of a tray for executing applications in mini modes according to an exemplary embodiment of the present invention.

FIG. 13 illustrates screens that describe an arrangement of a tray for executing applications in mini modes according to an exemplary embodiment of the present invention.

Referring to FIG. 13, a tray including second shortcut items for executing applications in mini modes may have different shapes or may be arranged in different locations on the display unit 110. For example, as shown in diagrams 1301 to 1307, the tray may be arranged on the top, bottom, left or right on the screen of the display unit 110, according to a user's settings. That is, the tray may be provided in a landscape mode as shown in diagrams 1301 and 1303 or in a portrait mode as shown in diagrams 1305 and 1307.

In the tray, the second shortcut items may be automatically arranged in one or more rows or columns according to the number as shown in diagrams 1301 to 1307. Alternatively, the second shortcut items may be enforcedly arranged, according to a user's settings, irrespective of the number. For example, the second shortcut items automatically arranged in two rows as shown in diagram 1301 can be enforcedly re-arranged in one or three rows (not shown). During the re-arrangement of the second shortcut items in the tray, they can be automatically placed in the altered number of rows or columns.

Figure 14:
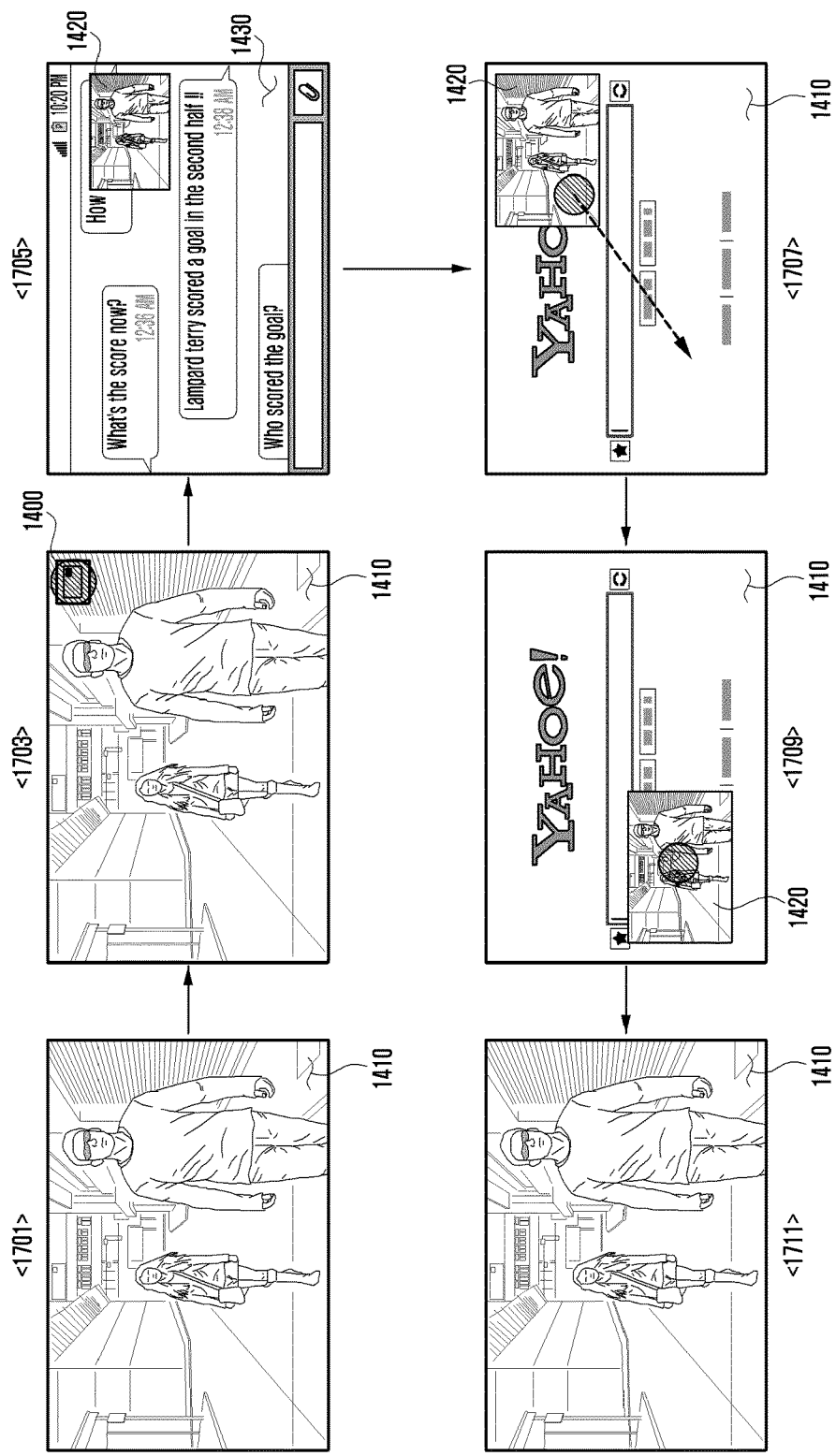
FIG. 14 illustrates screens that describe a method for executing an application in full and mini modes in a mobile device according to an exemplary embodiment of the present invention.

FIG. 14 illustrates screens that describe a mode executing method for executing an application in full and mini modes in a mobile device according to an exemplary embodiment of the present invention, via a mode switching item.

Referring to FIG. 14, as shown in diagram 1701, it is assumed that with an application executing in a full mode, the execution screen 1410 is displayed as the entire screen on the display unit.

During the display of the execution screen 1410 as shown in diagram 1701, an event for calling a mode switching item occurs on a region on the execution screen 1410. The mode switching item refers to an item for switching an application executed in a full mode to execution in a mini mode. The calling event refers to an event that occurs when the user touches a region where the mode switching item is allocated and hidden (e.g., at the top right of the screen shown in diagram 1703). The calling event may be achieved by at least one of a tap, a drag, a sweep, a flick, etc.

As shown in diagram 1703, the mode switching item 1400 may be displayed on the execution screen 1410 according to the calling event. That is, the mode switching item 1400 may be displayed in an activated/deactivated state on a preset region on the screen. For example, the mode switching item 1400 is not shown in the preset region, as shown in diagram 1701, and is then shown when the user creates the calling event, as shown in diagram 1703. The mode switching item 1400 may be provided as an icon in a region on every application execution screen.

During the display as shown in diagram 1703, the user creates an event for selection on the mode switching item 1400. In that case, the execution screen 1410 of the application in a full mode is switched to an execution screen 1420 of the application in a mini mode as shown in diagram 1705. Meanwhile, if another application has been executed as a background application while the application for the screen 1410 is being executed, during the multitasking mode, the execution screen 1430 of another application is displayed as the entire screen, for the application execution screen 1410, on the display unit. On the contrary, if there is no executed application as a background application while the application for the screen 1410 is being executed, a home screen is displayed on the display unit.

During the display as shown in diagram 1705, a new application is executed in a full mode or an application having been executed as a background application in a full mode is executed as a foreground application. In that case, as shown in diagram 1707, the execution screen 1410 of the new application or the previously executed application is displayed as the entire screen on the display unit while the mini screen 1420 of the application executed in a mini mode is retained as a higher layer than the execution screen 1410. For example, when the user views the screen of a currently executed application (e.g., a video, etc.) and further needs to process an additional job (e.g., web browsing, etc.), the user can switch the execution screen of the application in a full mode to in a mini mode and then browse the Web, viewing the mini mode screen.

The mini mode screen 1420 as shown in diagram 1705 or 1707 can be moved to a location in the area of the display unit. For example, a user can create a movement event on the mini mode screen 1420 at the top right on the display unit as shown in diagram 1707 to move it to a location (e.g., bottom left) as shown in diagram 1709.

As described above, when switching the full mode of the application to a mini mode and completing another job, the user can switch the mini mode of the application to the full mode and view the execution screen as the entire screen on the display unit. For example, during the display as shown in diagram 1709, the user can create an event (e.g., a tap event, etc.) on the mini screen 1420 in a mini mode. In that case, as shown in diagram 1711, the mini mode of the application is switched to a full mode and thus the execution screen 1410 is displayed as the entire screen on the display unit.

Figure 15:
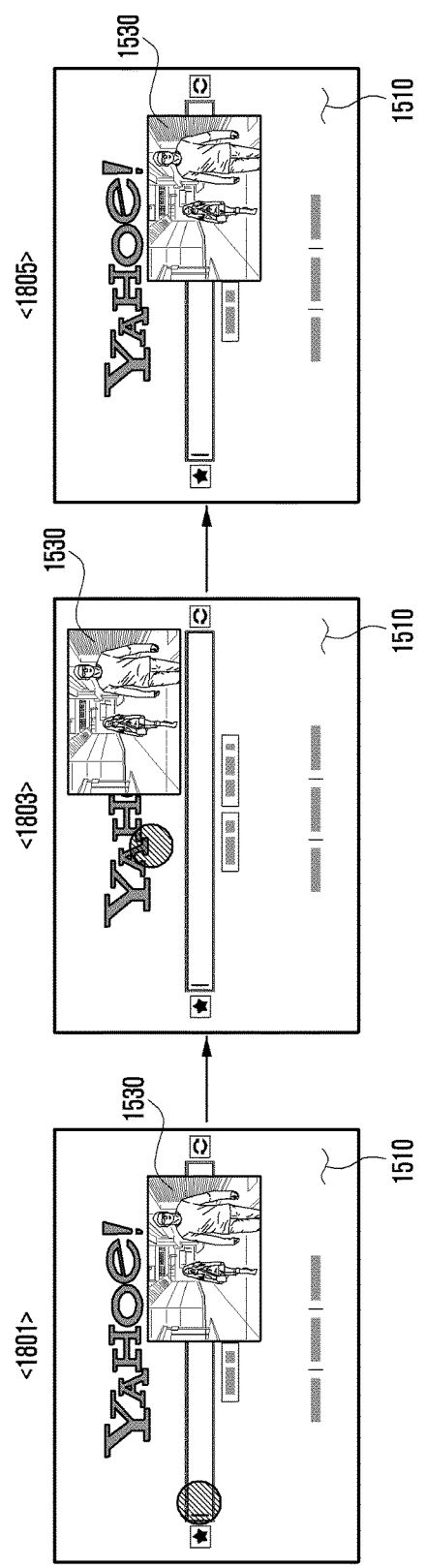
FIG. 15 illustrates screens that describe an automatic movement of a mini mode when executing a full mode in a mobile device according to an exemplary embodiment of the present invention.

FIG. 15 illustrates screens that describe an automatic movement of a mini mode when executing a full mode in a mobile device according to an exemplary embodiment of the present invention.

Referring to FIG. 15, as shown in diagram 1801, it is assumed that a first execution screen 1510 of a first application (related to a web browser, a messenger, a message, an email, etc., for example) executed in a full mode is displayed as the entire screen on the display unit and a second execution screen 1530 of a second application executed in a mini mode is displayed as a mini screen in a region on the first execution screen 1510. The second application may differ from the first.

During the display as shown in diagram 1801, when the user executes the first application, the first execution screen 1510 is displayed. More particularly, the user can select a field for inputting letters on the first execution screen 1510. For example, while the user is browsing the web in a full mode screen and viewing a video on the mini mode screen, the user can select a letter input field to input a key word for web search or a URL for accessing a new web site. In that case, the letter input field is activated on the first execution screen 1510.

Meanwhile, if the second execution screen 1530 for the second application is activated to be superimposed on the letter input field of the first execution screen 1510 as shown in diagram 1801, the user has difficulty inputting letters thereto. In that case, as shown in diagram 1803, the user can move the second execution screen 1530 from the letter input field, so that the user can more easily view the letter input field. After that, when the letter input field is deactivated, the second execution screen 1530 is automatically retuned to the original location as shown in diagram 1805. The deactivation of the letter input field can be achieved as the user touches other regions on the first execution screen 1510 as shown in diagram 1803.

As described above, when the system and method according to exemplary embodiments of the invention execute an application in full and mini modes, the execution screen in the mini mode can be moved in real time according to the operations of the execution screen in the full mode, thereby increasing the user convenience in the multitasking mode. For example, while a mobile device executes an application in full and mini modes, if the user creates an event in a region of the execution screen in the full mode, the controller 150 determines whether there is an execution screen in a mini mode at or near the user's created event. When the controller 150 ascertains that the execution screen in the mini mode is located on the region where the user creates an event, the execution screen can be moved in real time from the region according to the user's input. Therefore, while an application is executed in full and mini modes during the multitasking mode, the user does not need to move the execution screen in the mini mode and instead can process a variety of jobs (e.g., inputting keywords for web browsing, letters for writing messages or email, chatting via messengers, etc.) on the execution screen in the full mode.

Figure 16:
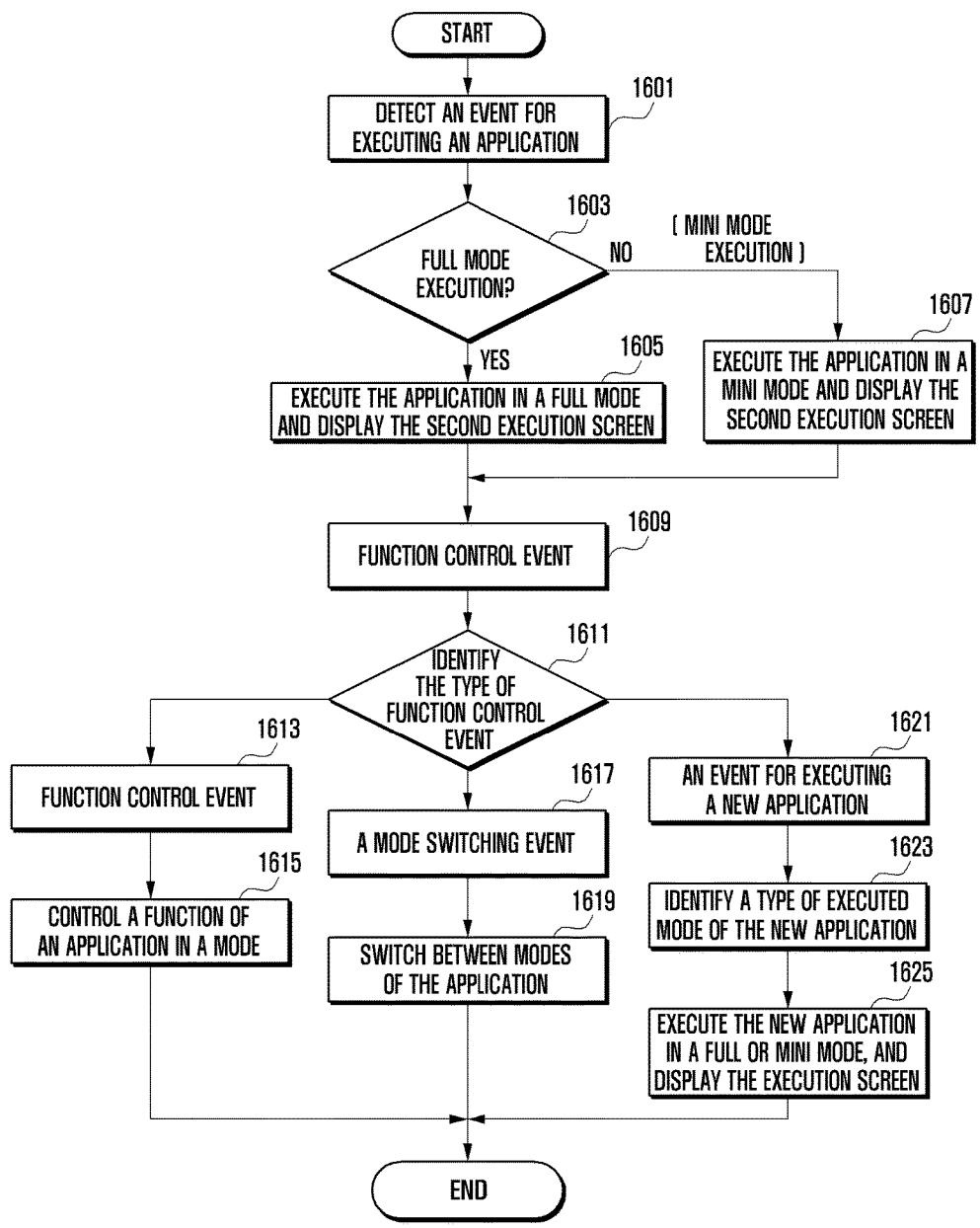
FIG. 16 illustrates a flowchart that describes a method for multitasking in a mobile device according to an exemplary embodiment of present the invention.

FIG. 16 illustrates a flowchart that describes a method for multitasking in a mobile device according to an exemplary embodiment of the present invention. The multitasking method executes applications in full and mini modes, thereby enhancing the use efficiency of resources in the mobile device.

Referring to FIG. 16, the controller 150 detects occurrence of an event for executing an application at step 1601. The user can create the execution event via a shortcut item to execute an application in a full or mini mode.

After detecting occurrence of the execution event at step 1601, the controller 150 identifies whether the type of execution event corresponds to the execution of an application in a full or mini mode at step 1603. The user creates the execution event on a first shortcut item on the home screen or a second shortcut item on a tray.

When the controller 150 ascertains that the type of execution event corresponds to the execution of an application in a full mode at step 1603, it executes the application in a full mode and displays the execution screen as the entire screen on the display unit 110 at step 1605. On the contrary, when the controller 150 ascertains that the type of execution event corresponds to the execution of an application in a mini mode at step 1603, it executes the application in a mini mode and displays the execution screen as a mini screen on the display unit 110 at step 1607. For example, when the controller 150 ascertains that the type of execution event is a first shortcut item, it executes an application corresponding to the first shortcut item in a full mode and/or a mini mode. Likewise, when the controller 150 ascertains that the type of execution event is a second shortcut item, it executes an application corresponding to the second shortcut item in a mini mode.

The controller 150 displays an application in a full or mini mode execution screen and determines whether there is at least one application that has been executed in a full or mini mode. If the controller 150 ascertains that at least one application has been executed in a full or mini mode, it can control the execution screens of the applications, considering the operations for switching between the execution screens and the arrangement of the execution screens.

While at least one application is executed in a full mode and/or a mini mode, the controller 150 detects an event for controlling a function at step 1609. In an exemplary embodiment of the invention, the function control event may include an event for executing a function of an application executed in a mode, an event for switching from a mode of the executed application to another, and an event for executing a new application, etc.

After detecting the function control event at step 1609, the controller 150 identifies the type of function control event at step 1611.

When the controller 150 ascertains that the type of function control event is a function executing event at step 1613, it controls a function of an application in a mode at step 1615. For example, the controller 150 can control a function of an application executed in a full or mini mode on the highest layer, according to the user's inputs. While first and second applications are executed in full and mini modes respectively, when the user operates functions on the execution screen of the first execution screen in a full mode, the second application executed in a mini mode can be moved, in real time, according to the regions on the execution screen where the user's inputs occur. This has been shown in FIG. 15.

When the controller 150 ascertains that the type of function control event is a mode switching event at step 1617, it switches between modes of the application and displays the execution screen according to the switched mode at step 1619. In an exemplary embodiment, the mode switching event may be an event for switching from an application executed in a full mode to an application executed in a mini mode, an event for switching from an application executed in a mini mode to an application executed in a full mode, an event for switching between applications executed in full and mini modes and applications executed in mini and full modes, and an event for switching from an application executed in a mode on the highest layer to another application executed on a layer in a full or mini mode. The mode switching operation may be achieved according to a user's input mode, a tray, or a mode switching item.

When the controller 150 ascertains that the type of function control event is an event for executing a new application at step 1621, it identifies a type of executed mode of the new application at step 1623. The controller 150 executes the new application in a full or mini mode according to the identified type, and displays the execution screen at step 1625.

Figure 17:
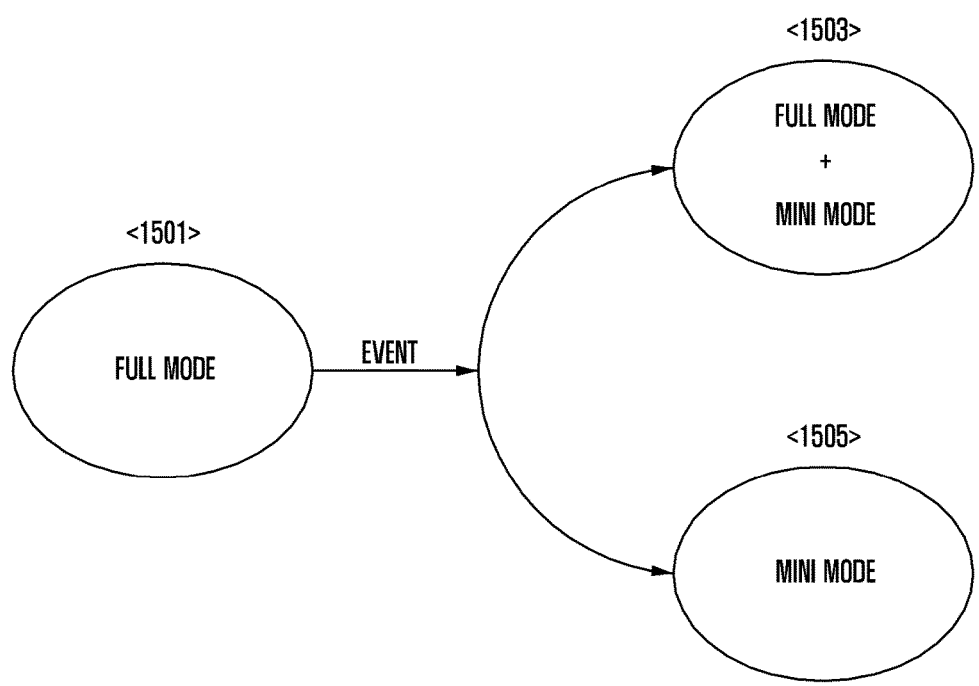
FIG. 17 illustrates a view that describes a process for operating modes corresponding to user events in a mobile device according to an exemplary embodiment of the present invention.

FIG. 17 illustrates a view that describes a process for operating modes corresponding to user events in a mobile device according to an exemplary embodiment of the present invention.

Referring to FIG. 17, as shown in diagram 1501, it is assumed that the mobile device executes an application in a full mode. During the display of the full mode execution screen, the user can create a mode switching event of the executed application. In an exemplary embodiment of the invention, when the mobile device receives the mode switching event, it activates a mini mode of the application, retaining the full mode application, as shown in diagram 1503. Alternatively, when the mobile device receives the mode switching event, it interrupts the full mode application that has been activated, and instead activates a mini mode of the application as shown in diagram 1505.

Figure 18:
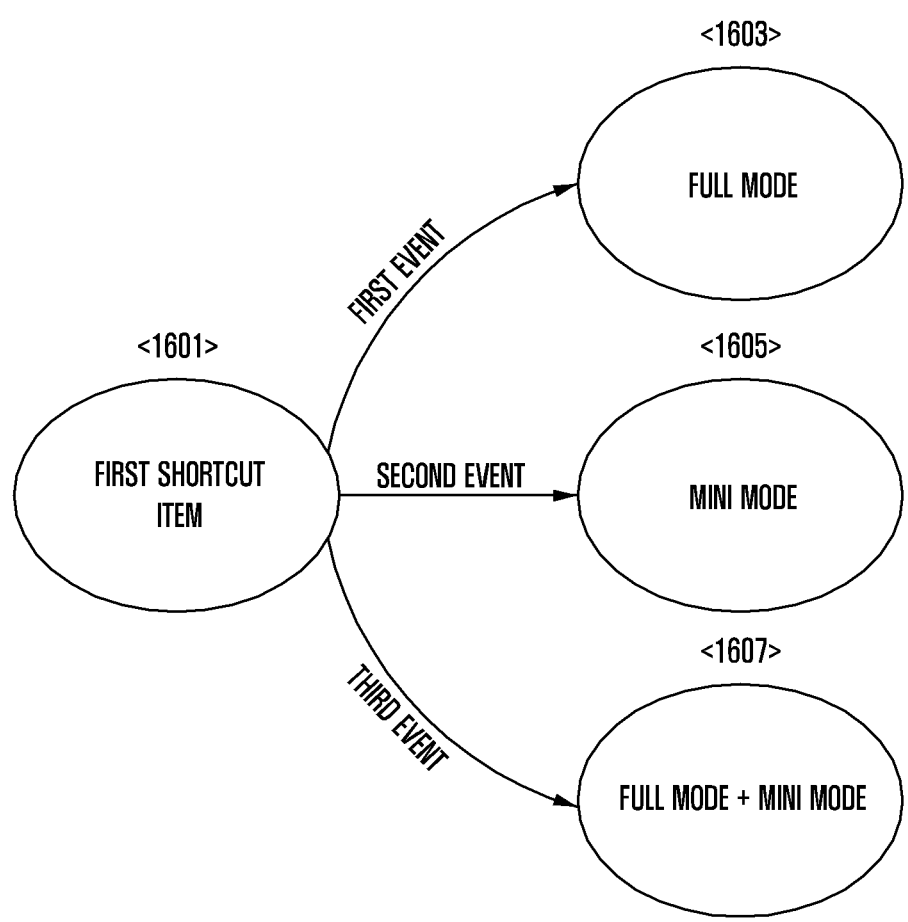
FIG. 18 illustrates a view that describes a process for operating modes corresponding to user events, using short cut items of applications, in a mobile device according to an exemplary embodiment of the present invention.

FIG. 18 illustrates a view that describes a process for operating modes corresponding to user events, using short cut items of applications, in a mobile device according to an exemplary embodiment of the present invention.

Referring to FIG. 18, as shown in diagram 1601, it is assumed that the mobile device displays a home screen on which a first shortcut item is shown. The first shortcut item executes a corresponding application in a full mode and/or a mini mode, according to the user's created event.

When the user creates a first event on the first shortcut item on the home screen as shown in diagram 1601, an application corresponding to the first shortcut item is executed in a full mode as shown in diagram 1603. Alternatively, when the user creates a second event on the first shortcut item on the home screen as shown in diagram 1601, an application corresponding to the first shortcut item is executed in a mini mode as shown in diagram 1605. In addition, when the user creates a third event on the first shortcut item on the home screen as shown in diagram 1601, an application corresponding to the first shortcut item is executed in full and mini modes as shown in diagram 1607. That is, in order to execute an application corresponding to a shortcut item in different modes, the events (first, second, and third events) that the user creates on the shortcut item (e.g., first shortcut item), may be set as different types of events. For example, a first event is set as a tap. A second event is set as a preset gesture. A third event is set as multi-touches, double taps, a touch and hold, or the like.

Alternatively, the invention may be implemented in such a way that the first shortcut item is set to execute an application only in a full mode and the second shortcut item in the tray is set to execute an application only in a mini mode, according to the user created event.

Alternatively, the second shortcut item in a tray may be set to execute an application in different modes according to types of user created events. However, it is preferable that the second shortcut item is set to execute an application only in a mini mode in order to enhance the efficiency of resources in the mobile device when it operates in a multitasking mode.

As described above, the multitasking operating system and method according to exemplary embodiments of the invention can efficiently execute multitasking in a mobile device with a limited amount of resources by operating applications in a mini mode and a full mode. The multitasking system and method can simultaneously execute a number of applications on one screen via downsized screens executed in mini mode, thereby maximizing the use efficiency of the screen. Therefore, the user can efficiently and conveniently use the mobile device, by simultaneously executing a number of applications via full and mini modes, during the multitasking mode of the mobile device.

The multitasking system and method according to exemplary embodiments of the invention can enhance the use efficiency of resources in the mobile device by operating an application on a screen in a full mode or on a downsized screen in a mini mode where a key function of the application is executed, during the multitasking mode of the mobile device. Therefore, the multitasking system and method can simultaneously execute a number of applications using a relatively small amount of resources since they can operate the applications executed in a mini mode, so that the user can operate the mobile device with a higher degree of performance.

The multitasking function according to exemplary embodiments of the invention can be applied to all types of mobile devices and the various types of electronic devices corresponding thereto. The multitasking system and method according to exemplary embodiments of the invention can provide an optimal environment where the mobile device with a limited amount of resources can efficiently execute multiple tasks. The multitasking system and method allows the mobile device to efficiently operate the screen in a multitasking mode, and to use the resources without reducing the speed or performance, so that the user can conveniently use the mobile device and manufacturers can produce competitive mobile devices.

As described above, the system and method for executing multitasks in a mobile device according to exemplary embodiments of the invention can be implemented with program commands that can be conducted via various types of computers and recorded in computer-readable recording media. The computer-readable recording media contain program commands, data files, data structures, or the like, or a combination thereof. The program commands recorded in the recording media may be designed or configured to comply with the invention or may be software well-known to the ordinary person skilled in the art.

The computer-readable recoding media includes hardware systems for storing and conducting program commands. Examples of the hardware systems are magnetic media such as a hard disk, floppy disk, a magnetic tape, optical media such as CD-ROM and DVD, Magneto-Optical Media, such as floptical disk, ROM, RAM, flash memory, etc. The program commands include assembly language or machine code complied by a complier and a higher level language interpreted by an interpreter. The hardware systems may be implemented with at least one software module to comply with the invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for executing multiple tasks in a mobile device, the method comprising:
   detecting, by the mobile device, a first execution event for executing a first application;
   identifying a type of the first execution event;
   executing the first application in one of a full mode and a mini mode according to the type of the first execution event;
   displaying an execution screen of the first application executed in the one of the full mode and the mini mode;
   after the displaying of the execution screen of the first application executed in the one of the full mode and the mini mode, subsequently detecting a second execution event for executing a second application represented by one of items included in a displayed tray, each of the items representing an application to be executed in one of the full mode and the mini mode;
   executing the second application in another of the full mode and the mini mode in response to the detected second execution event; and
   displaying an execution screen of the second application executed in the other of the full mode and the mini mode along with the displayed execution screen of the first application executed in the one of the full mode and the mini mode.

2. The method of claim 1, further comprising:
   executing, when the type of the first execution event corresponds to executing the first application in the full mode, the first application in the full mode and displaying the execution screen of the first application as an entire screen; and
   executing, when the type of the first execution event corresponds to executing the first application in the mini mode, the first application in the mini mode and displaying the execution screen of the first application as a mini screen.

3. The method of claim 2, wherein the first execution event is created on a first shortcut item on a home screen or a second shortcut item on the tray.

4. The method of claim 3, further comprising:
   executing, when the second execution event occurs on the first shortcut item, the second application corresponding to the first shortcut item in the other of the full mode and the mini mode, according to a type of the second execution event.

5. The method of claim 3, further comprising:
   controlling, when the second execution event occurs on the second shortcut item, the second application corresponding to the second shortcut item in the mini mode.

6. The method of claim 3, further comprising:
   receiving a function controlling event while the first application is executed in the one of the full mode and the mini mode.

7. The method of claim 6, further comprising:
   identifying a type of the function controlling event;
   controlling, when the type of the function controlling event is a function executing event, a function of the first application;
   switching, when the type of function controlling event is a mode switching event, a mode of the first application, and displaying an execution screen according to the switched mode; and
   executing, when the type of the function controlling event corresponds to executing a new application, the new application in the full mode or the mini mode, and displaying an execution screen of the new application.

8. The method of claim 7, wherein the mode switching event comprises at least one of:
   an event for switching from the first application executed in the full mode to the first application executed in the mini mode;
   an event for switching from the first application executed in the mini mode to the first application executed in the full mode;
   an event for switching between the first application and the second application respectively executed in the full mode and the mini mode and the first application and the second application respectively executed in the mini mode and the full mode; and
   an event for switching from one of the first application and the second application that is executed in a mode on a highest layer to another of the first application and the second application that is executed on a layer in the full mode or the mini mode.

9. The method of claim 8, further comprising:
   switching the full mode of the first application to the mini mode according to a user's input to a mode switching item, or switching the mini mode of the first application to the full mode according to a user's input to the mini screen in the mini mode.

10. The method of claim 9, further comprising:
    providing the mode switching item at a region on an execution screen where the first application is executed in the full mode,
    wherein the mode switching item is provided in a toggle mode or an ordinary mode.

11. The method of claim 9, further comprising:
    moving, in a state where the first and second applications are executed in the full mode and the mini mode respectively, the execution screen where the second application is executed in the mini mode, in real time, when functions are operated via the execution screen in the full mode, according to regions on the execution screen where a user input occurs.

12. The method of claim 3, further comprising:
    executing each of a plurality of applications in the full mode or the mini mode or in both the full mode and the mini mode.

13. The method of claim 3, further comprising:
    receiving an event for calling the tray on the execution screen of the first application in the full mode;

activating the tray on the execution screen of the first application;

creating the first execution event on the second shortcut item on the tray; and executing the first application according to the second shortcut item in the mini mode, and displaying the execution screen as a mini screen on the full mode execution screen.

14. The method of claim 13, further comprising:
deactivating the tray when executing the mini mode according to an input of the first execution event.

15. The method of claim 1, further comprising:
sharing, when the one of the mini mode and the full mode in which the first application is executed is interrupted, data, which is created when the first application is executed in the mini mode and the full mode, with the other mode of the full mode and the mini mode, and updating the execution screen.

16. The method of claim 15, further comprising:
automatically sharing, when the one of the mini mode and the full mode in which the first application is executed is interrupted, information, data and primary functions, which have been used by the first application in the interrupted mode, with the other mode, and controlling the first application in the other mode.

17. The method of claim 1, wherein, when the execution screen of the second application is displayed in the full mode as the entire screen and the execution screen of the first application is displayed in the mini mode:

detecting a dragging event in a corner of the execution screen of the first application displayed in the mini mode;

moving a location of the execution screen of the first application displayed in the mini mode in response to the detected dragging event;

detecting a third execution event in a central portion of the execution screen of the first application displayed in the mini mode; and displaying the execution screen of the first application in the full mode as the entire screen without displaying the execution screen of the second application.

18. A mobile device comprising:
a display unit configured to display screens of at least one application executed in a full mode or a mini mode;
a storage unit configured to store data created when the at least one application is executed in the full mode or the mini mode; and
a controller configured to:
identify a type of a first execution event;
execute a first application of the at least one application in at one of the full mode and the mini mode according to the identified type of the first execution event;
display an execution screen of the first application executed in the one of the full mode and the mini mode;
after the display of the execution screen of the first application executed in the one of the full mode and the mini mode, subsequently detect a second execution event for executing a second application represented by one of items included in a displayed tray, each of the items representing an application to be executed in one of the full mode and the mini mode;
execute the second application in another of the full mode and the mini mode in response to the detected second execution event; and
display an execution screen of the second application executed in the other of the full mode and the mini mode along with the displayed execution screen of the first application executed in the one of the full mode and the mini mode.

19. The mobile device of claim 18, wherein:
the controller is further configured to display, when executing the first application in the full mode, the execution screen of the first application as the entire screen; and
the controller is further configured to display, when executing the first application in the mini mode, the execution screen of the first application as a mini screen.

20. The mobile device of claim 18, wherein the controller is further configured to switch from at least one of the full mode of the at least one application to the mini mode of the at least one application, the mini mode of the at least one application to the full mode of the at least one application, the full mode of the first application and the mini mode of the second application to the mini mode of the first application and the full mode of the second application, and a mode where the first application is currently executed in a highest layer to the full mode or the mini mode of the second application.

21. The mobile device of claim 18, wherein the controller is further configured to switch from the full mode of the at least one application to the mini mode of the at least one application, according to a user's input to a mode switching item, and from the mini mode of the at least one application to the full mode of the at least one application, according to a user's input to a mini screen in a mini mode.

22. The mobile device of claim 21, wherein the mode switching item is provided in a toggle mode or an ordinary mode.

23. The mobile device of claim 18, wherein, when one of the mini mode and the full mode in which the at least one application is executed is interrupted, the controller is further configured to share data of the at least one application executed in the interrupted mode with another mode of the at least one of the full mode and the mini mode and to update the screen in the corresponding mode.

24. The mobile device of claim 18, wherein, in a state where the first application and the second application are executed in the full mode and the mini mode respectively, the controller is further configured to move the execution screen where the second application is executed in the mini mode, in real time, when functions are operated via the execution screen in the full mode, according to regions on the execution screen where a user input occurs.

25. A method for executing multiple tasks in a mobile device, the method comprising:
displaying, by the mobile device, an execution screen of a first application executed in a full mode as an entire screen according to a first execution event;
inputting a first user event of a first type to a mode switching item selectively provided on the execution screen in the full mode;
switching the full mode of the first application to a mini mode in response to the first user input event of the first type;
displaying the execution screen of the first application in the mini mode as a mini screen;
inputting a second user event of a second type on the mini screen in the mini mode;

switching the mini mode of the first application to the full mode in response to the second user input event of the second type;
displaying the execution screen of the first application in the full mode as the entire screen;
after the displaying of the execution screen of the first application in the full mode, subsequently detecting a second execution event for executing a second application represented by one of items included in a displayed tray, each of the items representing an application to be executed in one of the full mode and the mini mode;
executing the second application in the mini mode in response to the detected second execution event; and
displaying an execution screen of the second application executed in the mini mode along with the displayed execution screen of the first application executed in the full mode.

26. A non-transitory computer readable recording medium containing program instructions executable by a processor of a mobile device, the program causing the processor to execute a method comprising:
displaying an execution screen of a first application executed in a full mode as an entire screen according to a first execution event;
inputting a first user event of a first type to a mode switching item selectively provided on the execution screen in the full mode;
switching the full mode of the first application to a mini mode in response to the first user input event of the first type;
displaying the execution screen of the first application in the mini mode as a mini screen;
inputting a second user event of a second type on the mini screen in the mini mode;
switching the mini mode of the first application to the full mode in response to the second user input event of the second type;
displaying the execution screen of the first application in the full mode as the entire screen;
after the displaying of the execution screen of the first application in the full mode, subsequently detecting a second execution event for executing a second application represented by one of items included in a displayed tray, each of the items representing an application to be executed in one of the full mode and the mini mode;
executing the second application in the mini mode in response to the detected second execution event; and
displaying an execution screen of the second application executed in the mini mode along with the displayed execution screen of the first application executed in the full mode.

* * * * *